US007191365B2

(12) United States Patent
Ishii et al.

(10) Patent No.: US 7,191,365 B2
(45) Date of Patent: Mar. 13, 2007

(54) INFORMATION RECORDER AND ITS CONTROL METHOD

(75) Inventors: Yoshiyuki Ishii, Tokyo (JP); Yoshiaki Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 538 days.

(21) Appl. No.: 10/440,261

(22) Filed: May 19, 2003

(65) Prior Publication Data

US 2003/0214744 A1    Nov. 20, 2003

(30) Foreign Application Priority Data

May 20, 2002    (JP)    ............................. 2002-144694

(51) Int. Cl.
*G06F 11/00*    (2006.01)
(52) U.S. Cl. ........................................... 714/41; 714/6
(58) Field of Classification Search .................... 714/5, 714/6, 41, 42
See application file for complete search history.

(56) References Cited

U.S. PATENT DOCUMENTS

| | | | | |
|---|---|---|---|---|
| 5,090,014 | A * | 2/1992 | Polich et al. ................. | 714/26 |
| 5,961,651 | A * | 10/1999 | Gittins et al. .................. | 714/5 |
| 6,041,421 | A * | 3/2000 | Yamamoto ..................... | 714/7 |
| 6,970,310 | B2 * | 11/2005 | Kawaguchi et al. .......... | 360/31 |
| 2001/0007123 | A1 * | 7/2001 | Seguchi ...................... | 711/162 |
| 2001/0010085 | A1 * | 7/2001 | Rafanello et al. ........... | 714/710 |
| 2002/0104038 | A1 * | 8/2002 | Harmer ......................... | 714/6 |
| 2003/0112538 | A1 * | 6/2003 | Smith .......................... | 360/31 |

FOREIGN PATENT DOCUMENTS

| JP | 58-166472 A | 10/1983 |
|---|---|---|
| JP | 2-47712 A | 2/1990 |
| JP | 2-222027 A | 9/1990 |
| JP | 3-38716 A | 2/1991 |
| JP | 4-344922 A | 12/1992 |
| JP | 6-19792 A | 1/1994 |
| JP | 6-124169 A | 5/1994 |
| JP | 8-249791 A | 9/1996 |
| JP | 10-301719 A | 1/1998 |
| JP | 2002-132559 A | 5/2002 |

* cited by examiner

*Primary Examiner*—Michael Maskulinski
(74) *Attorney, Agent, or Firm*—Sughrue Mion, PLLC

(57) ABSTRACT

There is provided a high-availability duplexing or multiplexing information recorder where a process is not interrupted by a trouble of a drive or a medium. The information recorder is directed to write data instructed to be written from a host system in recording media of at least two drives. The recorder is configured to: detect an abnormality of each drive itself and an abnormality of the recording medium of each drive; cancel the writing of the data in the recording medium of the drive where an abnormality is detected or the drive having the recording medium where an abnormality is detected; and continue the writing of the data in the recording medium of the following drive without notifying any abnormality to the host system, as long as there is at least one drive where any abnormality is not detected and which has the recording medium where any abnormality is not detected.

24 Claims, 15 Drawing Sheets

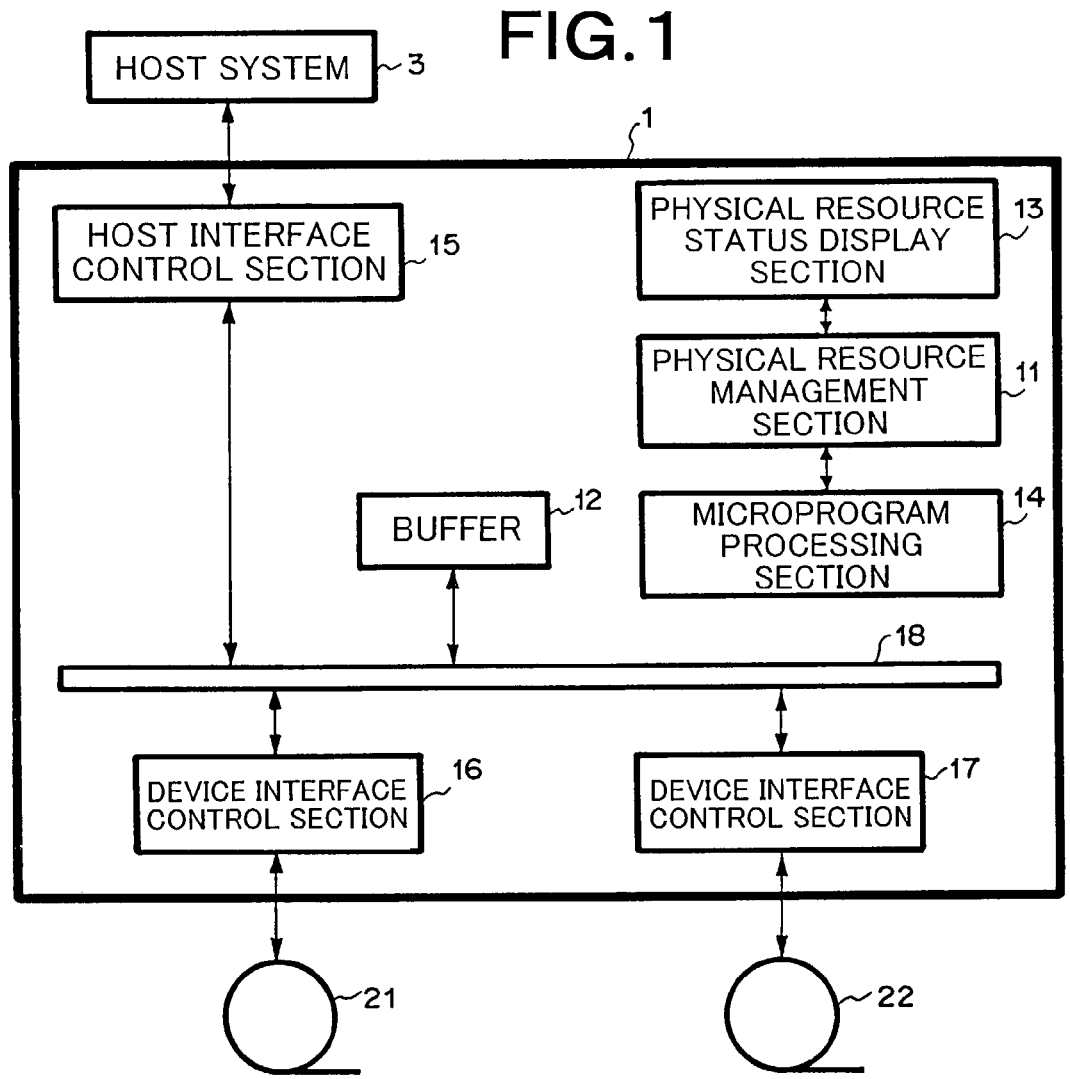
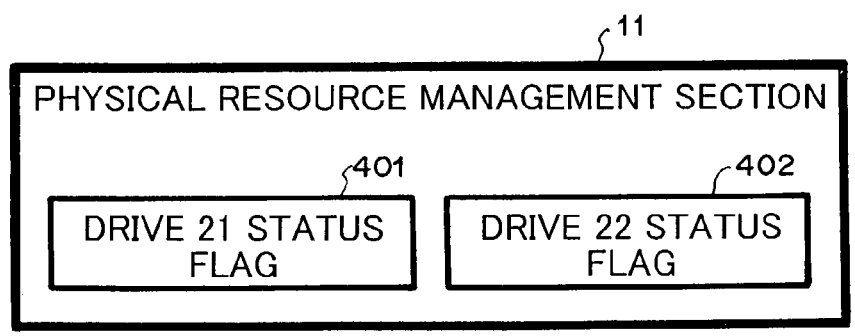

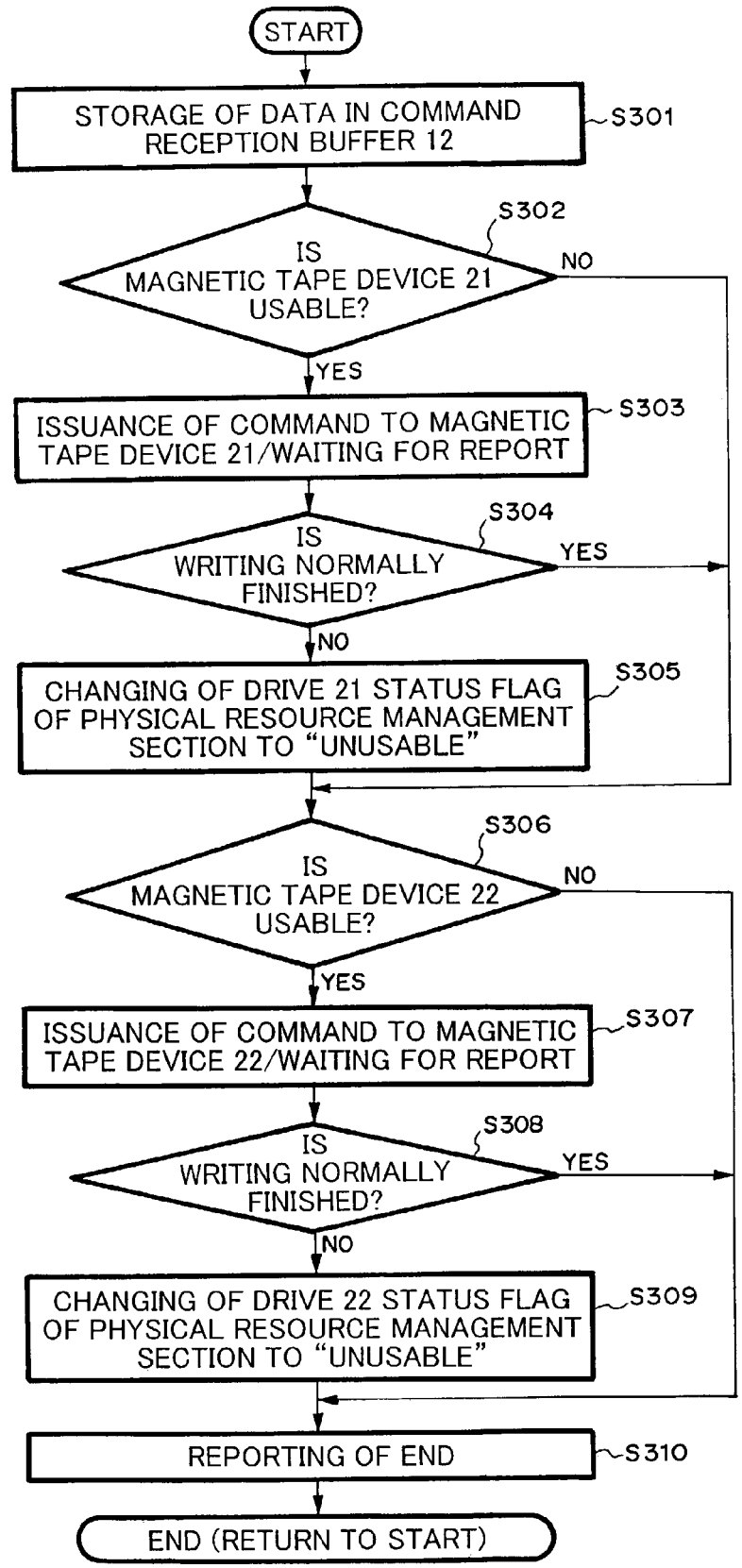

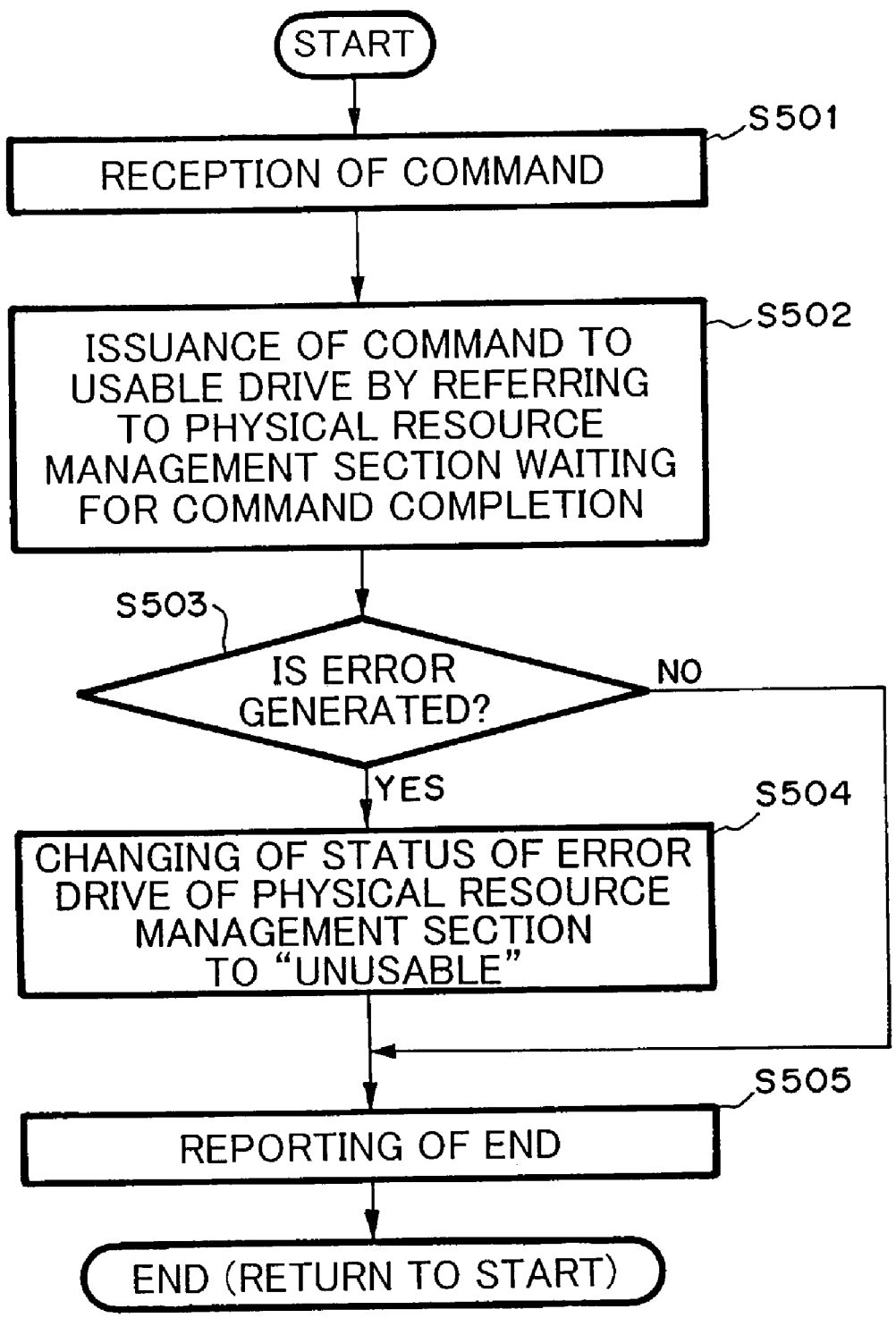

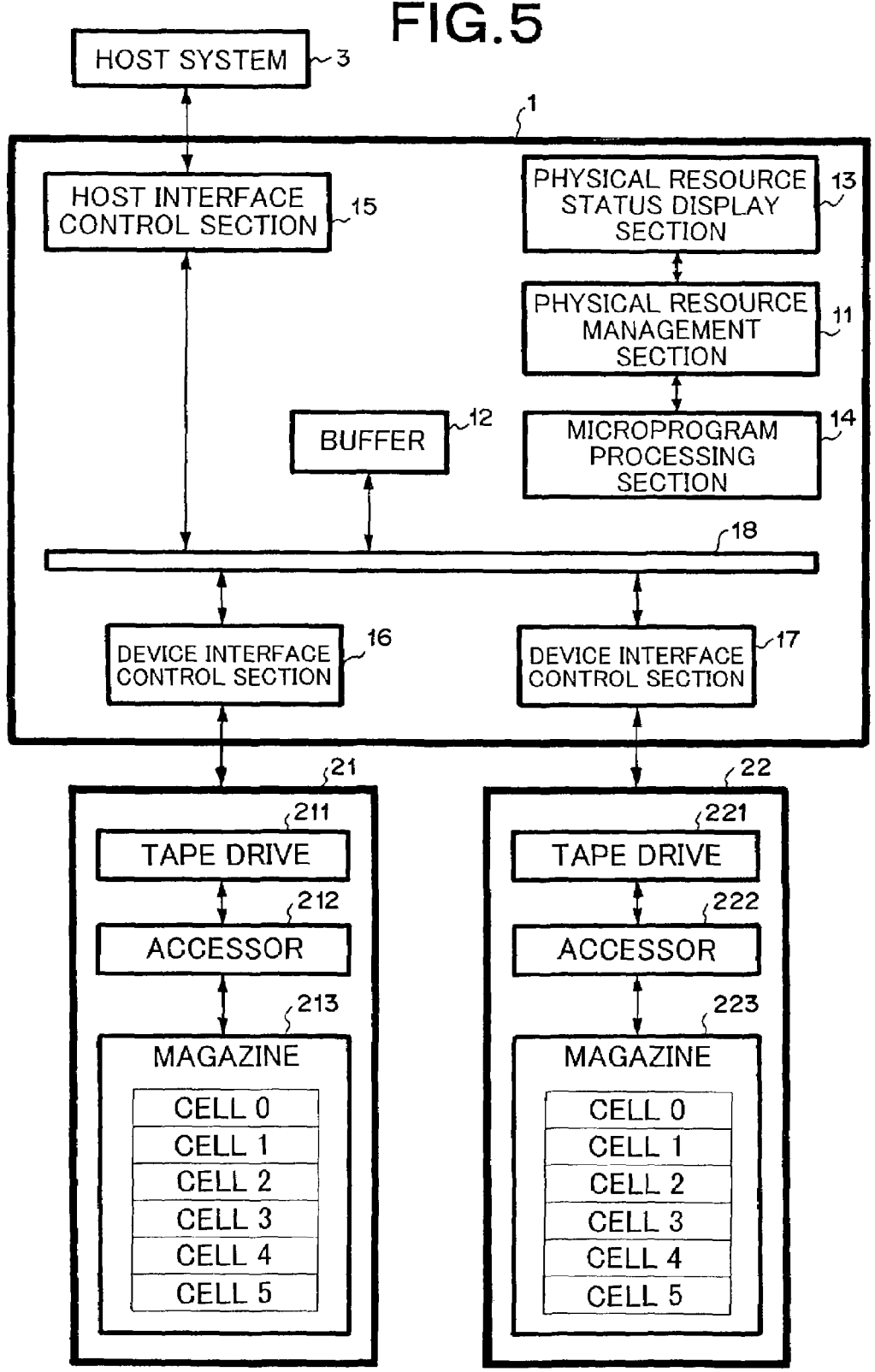

M.T. : MAGNETIC TAPE

FIG.10

| PROCESS RESULT | DRIVE STATUS FLAG | MAGNETIC TAPE STATUS FLAG |
|---|---|---|
| NORMAL (SUCCESSFUL WRITING) | USABLE | USABLE |
| FAILED WRITING DUE TO MEDIUM TROUBLE | USABLE | UNUSABLE |
| FAILED WRITING DUE TO DRIVE TROUBLE | UNUSABLE | USABLE |
| FAILED WRITING DUE TO TROUBLE | UNUSABLE | UNUSABLE |

M.T. : MAGNETIC TAPE

INFORMATION RECORDER AND ITS CONTROL METHOD

BACKGROUND OF THE INVENTION

1. Field of the Invention

The present invention relates to an information recorder and its control method, and more particularly to an information recorder which handles a removable sequential access medium such as a magnetic tape, and its control method.

2. Description of the Related Art

The sequential access medium such as the magnetic tape is used for data storage, e.g., database backup, in many cases. Generally, the database backup comprises copies of all data, and journal data such as information before updating and information after updating for update information of the database. In an on-line system, the journal data which is the update information of the database by sequentially executed transactions is very important for restoring data when troubles occur, and has been handled to enable strict maintenance of data integrity so much so that writing is considered to be completed at the time of duplexing on the magnetic tape in consideration of troubles of the magnetic tape medium. Recently, a requirement of real-time duplexing has become not so strict at the time of writing in the magnetic tape since the journal data is not directly written in the magnetic tape so often, but it is in many cases copied to be stored in the magnetic tape after being written in a magnetic disk or the like. However, such backup data is very important data which becomes necessary for restoration when data is broken down by troubles of the device or disasters. Thus, in order to prevent troubles such as impossibility of reading due to a medium trouble after writing in the magnetic tape, or in order to store the data at a remote place to prepare against disasters, a process of duplexing data is still carried out in many cases.

For original and copy duplexing of the data on the magnetic tape, there have been presented, for example, a method for increasing efficiency by reducing the number of used magnetic tape devices (JP-A-S58-166472) and a file creation method for facilitating management of data duplexed by a smaller number of magnetic tape devices (JP-A-H04-344922).

FIG. 16 shows a conventional example of a system and method for the original and copy duplexing of the data on the magnetic tape. As shown in FIG. 16, the system is on the assumption that writing is carried out in two magnetic tape devices 902 and 903 from a host system 901. This system has an advantage that all including interfaces from the host system 901 to the magnetic tape devices 902 and 903 can be duplexed, and has been widely used. However, the host system 901 must issue a writing command twice, which imposes a load on the host system 901.

In technical fields of the duplexing of the data on the magnetic tape, recently, a concept of a storage area network has spread especially, and there has been increased adoption of a system and method based on the concept. FIG. 17 shows a conventional example of a system using the storage area network. As shown in FIG. 17, a plurality of magnetic disks 912, 923, 914 and a plurality of magnetic tapes 915, 916 are connected to the same interface 911. In the case where the plurality of peripheral devices 912 to 916 are connected to the same interface 911, if the host system 901 issues the same writing command twice, not only a load on the host system 901 but also a usage rate (busy rate) of the interface 911 are increased.

To deal with such a problem, the inventors discloses an information recording/reproducing system which includes a function of mirroring by making two physical drives which seem one logical drive (JP-A-2002-132559). Because of the mirroring by making the two physical drives which seem one logical drive, the host system needs to issue a writing command only once to enable writing of data in a plurality of recording media. Accordingly, data duplexing can be achieved without increasing the load on the host system or the usage rate of the interface.

Needless to say, by employing such a form, compared with a system similar to that shown in FIG. 16 for carrying out writing in the two magnetic tape devices from the host system, redundancy is lost because of nonduplexing of the interface portion. However, as described above, the requirement of data duplexing to be carried out simultaneously with the writing in the magnetic tape is not so strict now, and only electric signals are normally transferred through the interface portion. Compared with troubles in a drive such as a magnetic tape device including a movable potion, e.g., a motor, and a removable medium such as a magnetic tape medium in which deterioration occurs due to a secular change, and physical stress is applied for each use, a probability of trouble occurrence is considerably smaller to be ignored.

However, in the case of mirroring by making the two physical drives which seem one logical drive, it is assumed that upon completion of writing from the host, two rolls of recording media of identical contents are generated. Thus, if one process is interrupted by a trouble of the physical drive or the recording medium, the occurrence of the trouble must be notified to the host system, consequently increasing a trouble rate by about twice.

In connection with the aforementioned problem, JP-A-H06-124169 discloses a method which enables continuation of a process by replacing a medium of a trouble with a spare medium prepared beforehand, and restoring data on the spare medium based on a content of a medium of no troubles when the medium trouble occurs in a duplexed autochanger.

However, this method supposes a case of a medium to be randomly accessed such as an optical disk. In a sequential access medium such as a magnetic tape, a tape position cannot be changed on-line and, even if it is replaced with a spare medium, the method disclosed in the JP-A-H06-124169 cannot be applied to restore a duplexing process.

An object of the present invention is to provide a high-availability duplexing or multiplexing information recorder for handling a sequential access medium such as a magnetic tape, where a process is not interrupted by a trouble of a drive or the medium.

SUMMARY OF THE INVENTION

According to the present invention, there is provided an information recorder for writing data instructed to be written from a host system in recording media of at least two drives, which comprises detection means for detecting an abnormality of each drive itself and an abnormality of the recording medium of each drive; cancellation means for canceling the writing of the data in the recording medium of the drive where an abnormality is detected or the drive having the recording medium where an abnormality is detected; and continuation means for continuing the writing of the data in the recording medium of the following drive without notifying any abnormality to the host system, as long as there is at least one drive where any abnormality is not detected and which has the recording medium where any abnormality is not detected.

The information recorder may further comprise display means for displaying that each drive and the recording medium of each drive are normal or abnormal.

In the information recorder, a plurality of recording media which can be specified by the host system are present to each drive; the detection means may detect an abnormality when the recording medium specified by the host system is mounted on or demounted from the drive; the cancellation means may cancel the writing of the data in the recording medium of the drive where an abnormality is detected, the drive of the recording medium where an abnormality is detected, or the drive where an abnormality is detected during the mounting or demounting; and the continuation means may continue the writing of the data in the recording medium of the following drive without notifying any abnormality to the host system, as long as there is at least one drive where any abnormality is not detected and which has the recording medium where any abnormality is not detected and where any abnormality is not detected during the mounting or demounting.

The information recorder may further comprise means for replacing, with a spare recording medium, the recording medium where an abnormality is detected, and means for copying the data on the spare recording medium, with which the recording medium where an abnormality is detected is replaced, from the recording medium, where an abnormality is detected, of a drive other than the drive of the recording medium where an abnormality is detected.

In the information recorder, a plurality of recording media which can be specified by the host system may be present to each drive set as a main drive; a plurality of spare recording media which cannot be specified by the host system may be present to the other drive set as a subdrive; the detection means may detect an abnormality when the recording medium specified by the host system is mounted on or demounted from the main drive and an abnormality when the spare recording medium is mounted on or demounted from the subdrive; the cancellation means may cancel the writing of the data in the recording medium of the drive where an abnormality is detected, the drive of the recording medium where an abnormality is detected, or the drive where an abnormality is detected during the mounting or demounting; the continuation means may continue the writing of the data in the recording medium of the following drive without notifying any abnormality to the host system, as long as there is at least one drive where any abnormality is not detected and which has the recording medium where any abnormality is not detected and where any abnormality is not detected during the mounting or demounting; replacement means for replacing the main drive with the subdrive where any abnormality is not detected, when an abnormality is detected in the main drive but any abnormality is not detected in the subdrive; and spare recording medium replacement means for replacing, with another spare recording medium, the spare recording medium where an abnormality is detected, when an abnormality is detected in the spare recording medium mounted on the subdrive.

BRIEF DESCRIPTION OF THE DRAWINGS

FIG. 1 is a block diagram showing a constitution of an information recorder according to an embodiment 1 of the present invention.

FIG. 2 is a view showing a flag held by a physical resource management section of the information recorder according to an embodiment 1 of the present invention.

FIG. 3 is a first flowchart showing an operation of the information recorder of the embodiment 1 of the present invention during serial writing FIG. 4 is a second flowchart showing an operation of the information recorder of the embodiment 1 of the present invention during parallel writing.

FIG. 5 is a block diagram showing a constitution of an information recorder according to an embodiment 2 of the present invention.

FIG. 10 is a table showing a relation among a drive status, a magnetic tape status flag and a process result according to an embodiment 3 of the present invention.

DESCRIPTION OF THE PREFERRED EMBODIMENTS

Figure 6:
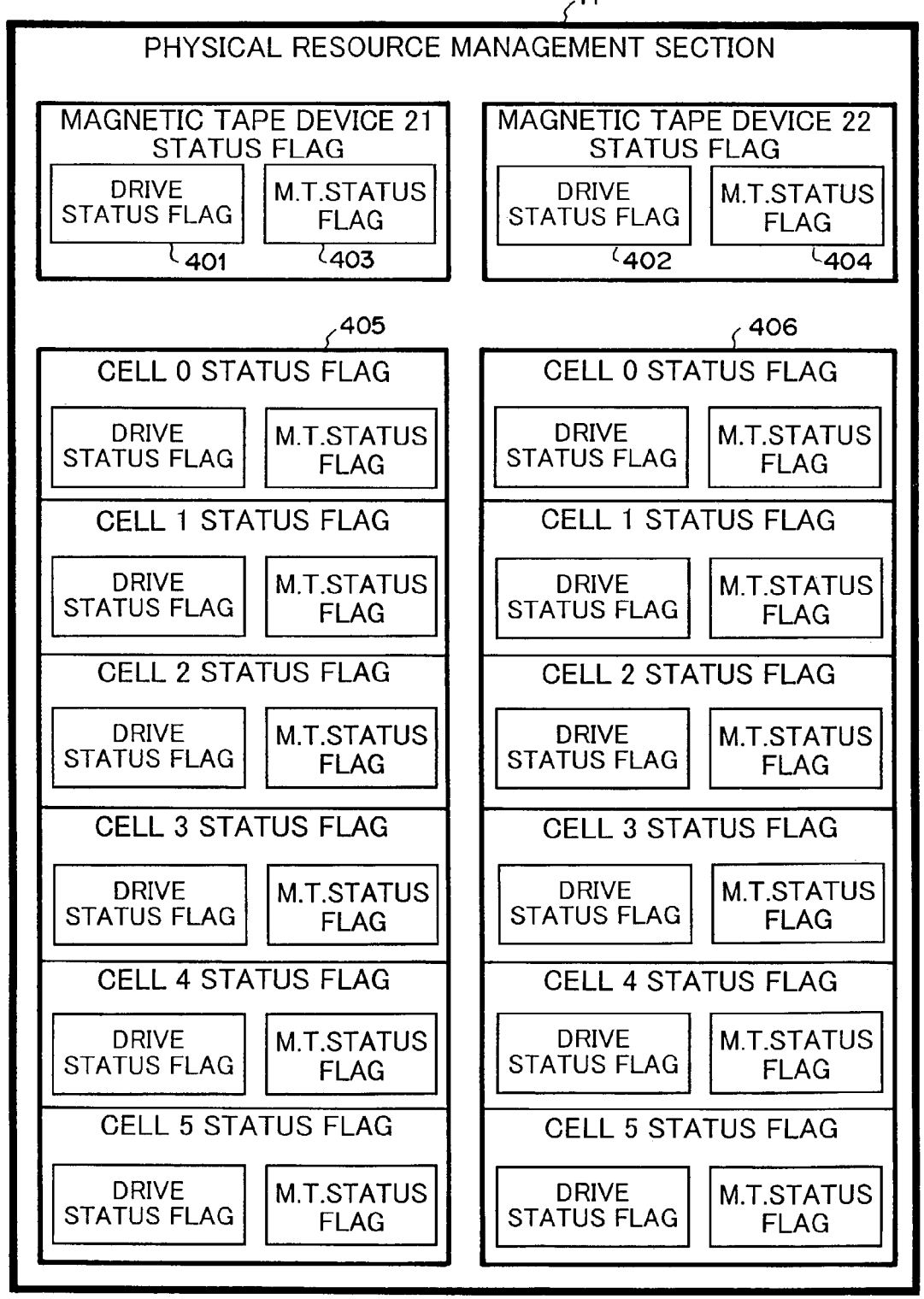
FIG. 6 is a view showing the flag held by a physical resource management section of the information recorder of the embodiment 2 of the present invention.

According to the present invention, an information recorder in which peripheral devices which handle removable sequential access media such as magnetic tapes are combined to seemingly bring a plurality of physical drives into one logical drive and to thereby carry out mirroring is characterized in that even if a drive trouble or a medium trouble occurs in one physical drive, the drive where the trouble is detected is cut off without making any error reports to a host system which instructs writing to enable continuation of a process only by normal drives.

FIG. 1 is a block diagram showing a constitutional example of the information recorder of the present invention.

As shown in FIG. 1, the information recorder 1 comprises a physical resource management section 11, which manages statuses of a plurality of physical drives 21, 22 connected to it and statuses of recoding media loaded thereon. This physical resource management section 11 manages a situation of error generation by troubles of the physical drives or defects of the recording media while the recording media are loaded on the drives, cancels use of a trouble generated physical drive 21 or 22 if the other drive 22 or 21 is in a normal operative status even when the trouble is generated in one physical drive 21 or 22, and operates only the physical drive 22 or 21 which can be normally operated.

Accordingly, since the trouble of one physical drive 21 or 22 is not reported from a host system 3, process interruption of the host system 3 can be prevented to improve availability.

The trouble of one physical drive 21 or 22 is concealed from the host system 3, and the host system 3 cannot recognize a duplex creation status of the medium, a trouble situation of the physical drive or the like. Thus, in addition to the host system 3 for instructing data writing, a physical resource status display section 13 is disposed to enable recognition of the duplex creation situation of the medium, the trouble situation of the physical drive etc., through a display such as an LED or a liquid crystal display, or other interfaces such as Ethernet (registered trade mark).

In the case of application to a device having an access mechanism for replacing a recording medium, such as a device equipped with a changer for handling a plurality of recording media or a library device, status information of the physical drive and status information of a recording medium loaded thereon are managed corresponding to a cell for storing the recording medium following transfer of the recording medium, whereby the host system 3 can be operated without interrupting its process even if a medium defect is generated. Additionally, a spare medium is prepared beforehand, and a function is provided to restore data in the spare recording medium by taking the chance of its preparation when duplexing fails due to the medium defect, thereby recovering the data duplexing.

[Embodiment 1]

FIG. 1 is a block diagram showing an embodiment of a system configuration using the information recorder of the present invention. The embodiment comprises the two magnetic tape devices 21, 22, the host system 3 for instructing writing/reading in the magnetic tape devices, and the duplexing information recorder 1 for making the two magnetic devices seem one magnetic device to the host system 3.

Referring to FIG. 1, the information recorder 1 of the embodiment comprises a host interface control section 15 for transferring commands or data with the host system 3, device interface control sections 16, 17 for transferring commands or data with the magnetic tape devices 21, 22, a buffer 12 for temporarily storing data transferred between the host system 3 and the magnetic tape devices 21, 22, an internal bus 18 for interconnecting these sections, the physical resource management section 11 for storing statuses of the magnetic tapes 21, 22, and a microprogram processing section 14 for integrating/controlling operations of such functional blocks based on a microprogram. Further, to enable an operator or a maintenance engineer to recognize a status of the physical resource management section 11, the information recorder 1 of the embodiment comprises the physical resource status display section 13 for displaying this status to the outside of the information recorder 1.

According to the embodiment, data writing from the host system 3 in the magnetic tape devices 21, 22 is roughly operated as follows.

A writing command issued from the host system 3 is received/interpreted by the host interface control section 15, and data to be written is temporarily stored through the internal bus 18 in the buffer 12. The data stored in the buffer 12 is written through the device interface control sections 16, 17 in the magnetic tape devices 21, 22. Accordingly, the data temporarily stored in the buffer 12 is written and duplxed in the two magnetic tape devices 21, 22. A series of these operations are realized by the microprogram processing section 14 based on a microprogram.

The physical resource management section 11 refers to error generation history of the magnetic tape devices 21, 22 to manage usable statuses of these devices. Upon reception of a writing instruction from the host system 3, the microprogram processing section 14 decides a magnetic tape device in which the data is written from the buffer 12 based on the managed status of the physical resource management section 11.

The physical resource status display section 13 displays physical resource statuses of the magnetic tape devices 21, 22, etc., understood by the physical resource management section 11 in asynchronization with the series of operations following the writing command process from the host system 3. Specifically, the physical resource status display section 13 is means for displaying the physical resource statuses of the magnetic tape devices 21, 22 etc. on the display section disposed outside the information recorder 1 through a display such as an LED (Light Emitting Diode) or an LCD (liquid Crystal Display) panel disposed outside the information recorder 1, and its display control mechanism or Ethernet (registered trade mark).

Next, an operation of the information recorder 1 of the embodiment will be described in detail by referring to flowcharts of FIGS. 1, 2 and 3.

FIG. 2 shows a drive status managed by the physical resource management section 11 of the embodiment. In the physical resource management section 11, bits of information 401, 402 of two flags (drive 21 status flag, drive 22 status flag) are stored to indicate statuses of the magnetic tape devices 21, 22. These flags have information regarding the statuses of the magnetic tape devices 21, 22 and error generation history of magnetic tape media loaded on the magnetic tape devices 21, 22. Normally, when the two magnetic tape devices 21, 22 are in normal usable statuses, if a new magnetic tape medium is loaded, the two status flags 401, 402 in the physical resource management section 11 are both initialized to values indicating "usable".

Next, the operation of the information recorder 1 will be described by referring to the flowchart of FIG. 3.

Upon issuance of a data writing command in a magnetic tape from the host system 3 to the information recorder 1, the command and write data are received through the host interface control section 15, and the received data is stored in the buffer 12 (step S301). Subsequently, the microprogram processing section 14 refers to the information flag 401 in the physical resource management section 11 to investigate whether the magnetic tape device 21 is usable or not (step S302). If usable, it issues a writing command through the device interface control section 16 to the magnetic tape device 21 to write the data stored in the buffer 12 (step S303). If the writing command of step S303 is normally completed (step S304, YES), the microprogram processing section 14 refers to the information flag 402 in the physical resource management section 11 to investigate whether the magnetic tape device 22 is usable or not (step S306). If usable, it issues a writing command through the device interface control section 17 to the magnetic tape device 22 to write the data stored in the buffer 12 (step S307). If the writing command of step S307 is normally completed (step S308, YES), the microprogram processing section 14 reports a normal end to the host system 3 (step S310), temporarily stores the data in the buffer 12, and discards the data to finish the process. In the end report to the host system 3 in step S310, even if writing is normally finished in only one of the magnetic tape devices 21, 22, the normal end is reported.

If the data writing in the magnetic tape device 21 of step S303 is finished as an error (step S304, No), the information flag 401 regarding the magnetic tape device 21 in the physical resource management section 11 is rewritten to a value indicating "unusable" (step S305), and the process proceeds to next step S306. Similarly, if the data writing in the magnetic tape device 22 of step S307 is finished as an error (step S308, No), the information flag 402 regarding the magnetic tape device 22 in the physical resource management section 11 is rewritten to a value indicating "unusable" (step S309), and the process proceeds to next step S306.

If the magnetic tape device 21 has been set in an "unusable" status at a point of time when the writing command is received from the host system 3, by determination in step S302, the writing process in the magnetic tape 21 (steps S303, S304) is bypassed. Similarly, if the magnetic tape device 22 has been set in an "unusable" status at a point of time when the writing command is received, by determination in step S306, the writing process in the magnetic tape 22 (steps S307, S308) is bypassed. However, if the data writing is successful even in only one of the magnetic tape devices 21, 22, for an end report of this writing command, a normal end is reported in step S310, generation of any writing errors is not recognized in the host system 3, and the process is continued.

By repeating the process of the flowchart of FIG. 3, the flags 401, 402 indicating the "usable", "unusable" of the magnetic tape devices 21, 22 managed in the physical resource management section 11 are held until the magnetic tape medium is unloaded, and a new magnetic tape medium is loaded to initialize the information in the physical resource management section 11.

That is, even if an error of one kind or another is generated in one magnetic tape device, without using the error-generated magnetic tape device, the process is continued while maintaining a degraded status by only the magnetic tape device which can be operated normally.

According to the embodiment, the statuses of the magnetic tape devices 21, 22 are always held in the physical resource management section 11, and the statuses of the magnetic tape devices 21, 22 managed by the physical resource management section 11 are displayed to the outside by the physical resource status display section 13. The two magnetic tape devices 21, 22 are recognized logically as one magnetic tape device from the host system 3. However, the statuses of the physical magnetic tape devices 21, 22 are displayed by the physical resource status display section 13, and thereby completion of duplex writing in the magnetic tape, or writing of normal data in the magnetic tape medium loaded on either one of the magnetic tape devices 21, 22 if failed is notified to the operator or the maintenance engineer.

To simplify explanation, the embodiment has been described based on the flow of FIG. 3 where after the end of the writing in the magnetic tape 21, the writing is carried out in the magnetic tape device 22. However, it is not necessary to carry out sequential writing in the two magnetic tape devices 21, 22. As shown in FIG. 4, if the drive status flag managed in the physical resource management section 11 is determined and the magnetic tape devices 21, 22 both exhibit usable statuses, a constitution may be adopted where writing is simultaneously carried out in the two magnetic tape devices 21, 22 (steps S501 to S505). The same applies to the other embodiments described below.

[Embodiment 2]

The embodiment 1 has been described by supposing the device of manually loading/replacing the magnetic tape medium in the magnetic tape device for processing a single medium. Next, as an embodiment 2, description will be made of a constitution of a magnetic tape device of an autochanger type for processing a plurality of magnetic tape media rather than a magnetic tape device for processing a single magnetic tape medium which is similar to that of the embodiment 1.

FIG. 5 is a block diagram showing the embodiment 2 of a system configuration using the information recorder of the present invention. According to the embodiment, two magnetic tape devices 21, 22 connected to the information recorder 1 are magnetic tape devices of autochanger types, which include tape drives 211, 221, magazines 213, 223 for housing pluralities of media, and accessors 212, 222 for carrying the media. In the embodiment, the magazine is shown to store 6 rolls of magnetic tape media of a cell 0 to a cell 5. However, the number is not limited to the 6 rolls, and any number may be set. According to the embodiment, it is assumed that a duplexed magnetic tape medium is stored in each cell corresponding to the magazine, and the magnetic tape medium can be manually replaced by a magazine unit.

In FIG. 5, functions of a buffer 12, a physical resource status display section 13, a microprogram processing section 14, a host interface control section 15, device interface control sections 16, 17, and an internal bus 18 constituting the information recorder 1 are similar to those of the embodiment 1, and thus description thereof will be omitted.

As shown in FIG. 6, the physical resource management section 11 holds drive status flags 401, 402 indicating statuses of the tape drives 211, 221, magnetic tape status flags 403, 404 indicating error generation history of magnetic tape media loaded on the tape drives 211, 221, and cell status flag groups 405, 406. The cell status flag groups 405, 406 include drive status flags indicating statuses of the tape drives 211, 221 at the time of writing in the magnetic tape media stored in the cells of the magazines 213, 223, and magnetic tape status flags indicating error generation history of the magnetic tape media. According to the embodiment, when the two magnetic tape devices 21, 22 are in normal usable statuses, if a new magazine is loaded, the drive status flags and the magnetic tape status flags (all the flags of the flag group 405 and the flag group 406) for all the cells in the magazines 213, 223 are initialized to values indicating "usable". If the magnetic tape media are taken out from any of the cells in the magazines 213 and 223 to be loaded on the tape drives 211 and 221 by a command from the host system 3, the magnetic tape status flags 403 and 404 for the magnetic tape media loaded on the tape drives 211 and 221 are both initialized to values indicating "usable".

According to the embodiment, since the connected magnetic tape devices 21, 22 are autochanger types, an operation of mounting/demounting the magnetic tape media is also carried out in accordance with a command from the host system 3. Hereinafter, processes during mounting of the magnetic tape media, data writing and demounting of the magnetic tape media will be described by referring to block diagrams of FIGS. 5 and 6 and flowcharts of FIGS. 7, 8 and 9.

The mounting of the magnetic tape medium is started after the host system 3 issues a mounting command together with a cell number in a magazine from which the magnetic tape medium is taken out to the information recorder 1. This mounting command is received/interpreted through the host interface control section 15 (step S701). Subsequently, the microprogram processing section 14 refers to the drive status flag 401 in the physical resource management section 11 to investigate whether the tape drive 211 is usable or not (step S702). If usable, it instructs the accessor 212 through the device interface control section 16 to transfer the magnetic tape medium from a specified cell in the magazine 213 to the tape drive 211 (step S703). If the transfer of the magnetic tape medium of step S703 is normally completed (step S704, YES), the drive status flag 401 and the magnetic tape status flag 403 in the physical resource management section 11 are both set to "usable" values (step S705). If a result of the usability determination of the tape drive 211 of step S702 is unusable (step S702, NO), and if an error is generated in the transfer of the magnetic tape medium of step S703 (step S704, NO), the drive status flag 401 and the magnetic tape status flag 403 in the physical resource management section 11 are both set to unusable values (step S706).

Subsequently, the microprogram processing section 14 refers to the drive status flag 402 in the physical resource management section 11 to investigate whether the tape drive 221 is usable or not (step S707). If usable, the magnetic tape medium is transferred from a specified cell in the magazine 223 to the tape drive 221 (step S708). If the transfer of the magnetic tape medium of step S708 is normally completed (steps S709, YES), the drive status flag 402 and the magnetic tape status flag 404 in the physical resource management section 11 are both set to values indicating "usable" (step S710). If a result of the usability determination of the tape drive 221 of step S707 is unusable (step S707, NO), and if an error is generated in the transfer of the magnetic tape medium of step S708 (step S709, NO), the drive status flag 402 and the magnetic tape status flag 404 in the physical resource management section 11 are both set to values indicating "unusable" (step S711).

Upon completion of the series of operations, an end report is made to the host system 3 (step S712) to finish the process. In the end report to the host system 3 of step S712, a normal end is reported if the mounting process is normally finished even in only one of the tape drives 211, 221. That is, if the mounting process is successful in one of the tape drives 211, 221, for an end report of the mounting command, a normal end is reported in step S712, generation of any mounting errors is not recognized in the host system 3, and the process is continued. In accordance with the success/failure of the mounting process, the drive status flags 401, 402 indicating the statuses of the tape drives 211, 221 in the physical resource management section 11, and the magnetic tape status flags 403, 404 indicating the statues of the magnetic tape media loaded thereon are set to "usable" or "unusable" statuses.

Next, a process during data writing will be described by referring to the flowchart of FIG. 8. When the host system 3 issues a command of writing data in the magnetic tape to the information recorder 1, the command and the writing data are received through the host interface control section 15, and the received data is stored in the buffer 12 (step S801). Subsequently, the microprogram processing section 14 refers to the drive status flag 401 in the physical resource management section 11 to investigate whether the tape drive 211 is usable or not (step S802). If usable, it issues a writing command through the device interface control section 16 to the tape drive 211 to write the data stored in the buffer 12 (step S803). If the transfer of the writing command of step S803 is normally completed (step S804, YES), the microprogram processing section 14 refers to the drive status flag 402 in the physical resource management section 11 to investigate whether the tape drive 221 is usable or not (step S808). If usable, it issues a writing command through the device interface control section 17 to the tape drive 221, and the data stored in the buffer 12 is written (step S809). If the writing command of step S809 is normally completed (step S810, YES), a normal end is reported to the host system 3 (step S814), and the data temporarily stored in the buffer 12 is discarded to finish the process. In the end report to the host system 3 of step S814, a normal end is reported if the writing process is normally finished even in only one of the tape drives 211, 221.

If an error occurs in the data writing in the tape drive 211 in step S803 (step S804, NO), subsequently a cause of the error is investigated. In the embodiment, to simplify explanation, it is assumed that only two kinds of errors are generated, i.e., an error caused by a trouble of the tape drive and a data error caused by a trouble of the magnetic tape medium. If a trouble cause is conceivably a trouble of the magnetic tape medium (step S805, YES), the magnetic tape status flag 403 indicating error generation history of the magnetic tape medium loaded on the tape drive 211 in the physical resource management section 11 is rewritten to a flag indicating "unusable" (step S806), and the process proceeds to next step S808. If a trouble cause is conceivably a trouble of the tape drive 211 (step S805, NO), the drive status flag 401 indicating the status of the tape drive 211 in the physical resource management section 11 is rewritten to a flag indicating "unusable" (step S807), and the process proceeds to step S808. Similarly, if an error occurs in the data writing in the tape drive 221 in step S809 (step S810, NO), a cause of the error is investigated. If a trouble cause is conceivably a trouble of the magnetic tape medium (step S811, YES), the magnetic tape status flag 404 indicating error generation history of the magnetic tape medium loaded on the tape drive 221 in the physical resource management section 11 is rewritten to a flag indicating "unusable" (step S812), and the process proceeds to next step S814. If a trouble cause is conceivably a trouble of the tape drive 221 (step S811, NO), the drive status flag 402 indicating the status of the tape drive 221 in the physical resource management section 11 is rewritten to a flag indicating "unusable" (step S813), and the process proceeds to step S814.

If the magnetic tape device 211 has been set in an "unusable" status at a point of time when the writing command is received from the host system 3, by determination in step S802, the writing process in the magnetic tape 211 (steps S803 to S807)is bypassed. Similarly, if the magnetic tape device 221 has been set in an "unusable" status at a point of time when the writing command is received, by determination in step S808, the writing process in the magnetic tape 221 (steps S809 to S813) is bypassed.

If the data writing is successful even in only one of the magnetic tape devices 211, 221, for an end report of this writing command, a normal end is reported in step S814, generation of any writing errors is not recognized in the host system 3, and the process is continued.

Figure 8:
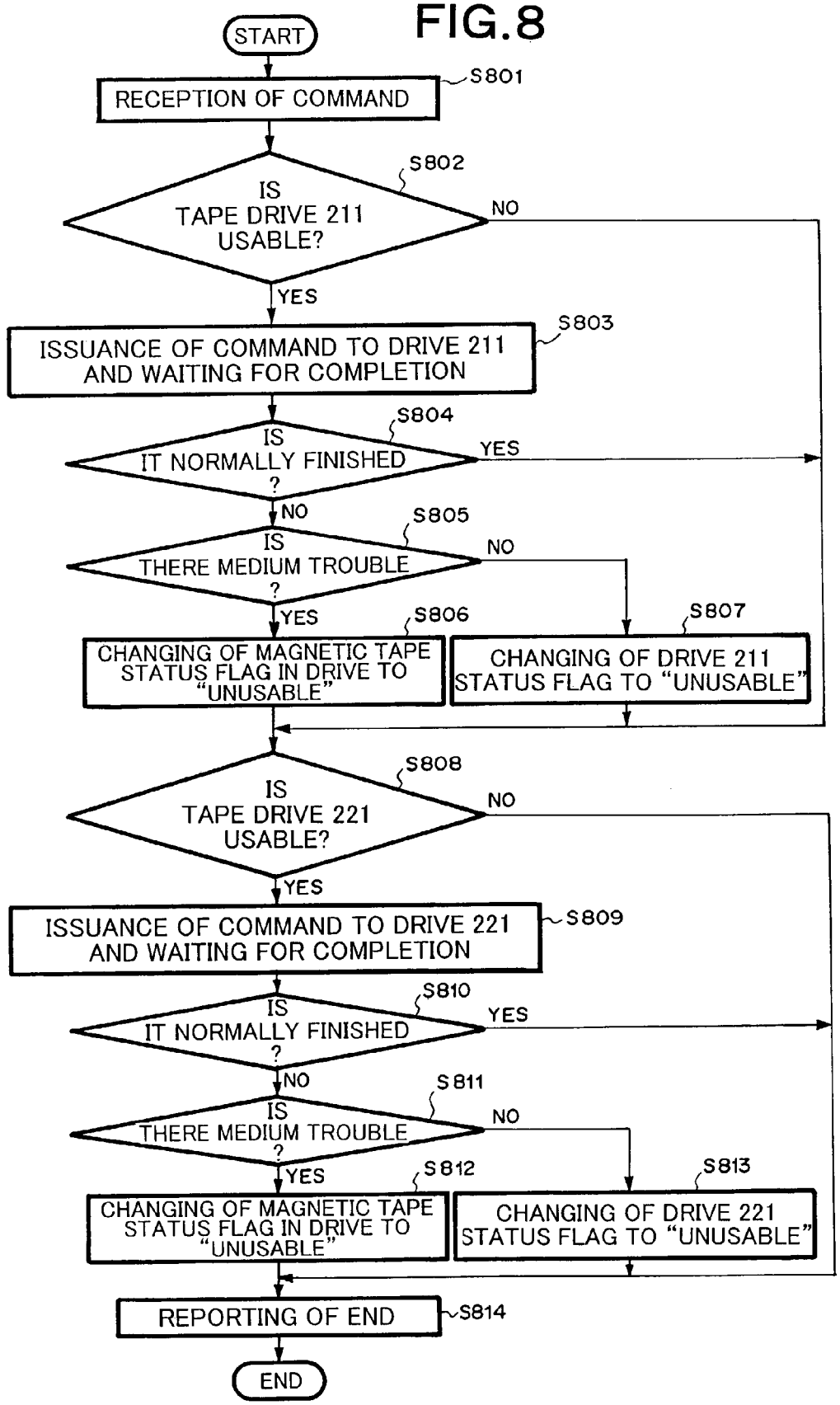
FIG. 8 is a flowchart showing an operation during data writing according to the embodiment 2 of the present invention.

By repeating the process of the flowchart of FIG. 8, if an error occurs during the process, in accordance with the cause, management is carried out by the drive status flags 401, 402 indicating the statuses of the tape drives 211, 221 in the physical resource management section 11 or the magnetic tape status flags 403, 404 indicating the error generation statuses of the magnetic tape media loaded on the tape drives 211, 221. The magnetic tape status flags 403, 404 indicating the error generation history of the magnetic tape media are held until the magnetic tape media are demounted. That is, even if an error of one kind or another is generated in one magnetic tape device, without using the error-generated tape drive, the process is continued while maintaining a degraded status by only the tape drive which can be operated normally. If the degraded status is set because of a trouble of the magnetic tape medium, the degraded status is released by taking a chance of medium replacement.

Next, description will be made of a process of demounting the magnetic tape medium from the tape drive to the magazine by referring to the flowchart of FIG. 9.

The demounting of the magnetic tape medium is started after the host system 3 finishes writing in the loaded magnetic tape medium, and issues a cell number in the magazine to which the magnetic tape medium is returned together with a demounting command to the information recorder 1.

This demounting command is received/interpreted through the host interface control section 15 (step S901). Subsequently, the microprogram processing section 14 refers to the drive status flag 401 and the magnetic tape status flag 403 in the physical resource management section 11 to investigate whether the tape drive 211 and the mounted magnetic tape medium are usable or not and, if usable in either one of them (step S902, YES), it instructs the accessor 212 through the device interface control section 16 to transfer the magnetic tape medium from the tape drive 211 to a specified cell in the magazine 213 (step S903). If the transfer of the magnetic tape medium of step S903 is normally completed (steps S904, YES), the process proceeds to next step S906. If an error is generated in the transfer of the magnetic tape medium of step S903 (step S904, NO), the drive status flag 401 indicating the status of the tape drive 211 in the physical resource management section 11, and the magnetic tape status flag 403 indicating the status of the magnetic tape medium loaded thereon are both changed to statuses indicating "unusable" (step S905).

Subsequently, the microprogram processing section 14 refers to the drive status flag 402 and the magnetic tape status flag 404 in the physical resource management section 11 to investigate whether the tape drive 221 and the mounted magnetic tape medium are usable or not and, if "usable" in either one of them (step S906, YES), it instructs the accessor 222 to transfer the magnetic tape medium from the tape drive 221 to a specified cell in the magazine 223 (step S907). If the transfer of the magnetic tape medium of step S907 is normally completed (step S908, YES), the process proceeds to next step S910. If an error is generated in the transfer of the magnetic tape medium of step S907 (step S908, NO), the drive status flag 402 of the tape drive 221 and the magnetic tape status flag 404 of the loaded magnetic tape medium are both changed to statuses indicating "unusable" (step S909).

Upon completion of the series of operations, the drive status flag 401 indicating the status of the tape drive 211 and the magnetic tape status flag 403 indicating the error generation history of the magnetic tape medium loaded on the tape drive 211 are copied on a drive status flag and a magnetic tape status flag corresponding to the storage cell number of the magazine of the magnetic tape medium in the cell status flag group 405. Similarly, the drive status flag 402 indicating the status of the tape drive 221 and the magnetic tape status flag 404 indicating the error generation history of the magnetic tape medium loaded on the tape drive 221 are copied on a drive status flag and a magnetic tape status flag corresponding to the storage cell number of the magazine of the magnetic tape medium in the cell status flag group 406 (step S910).

Upon completion of the above operations, an end report is made to the host system 3 (step S911) to finish the process. In the end report to the host system 3 of step S911, a normal end is reported if the demounting process is normally finished even in only one of the tape drives 211, 221. That is, if the demounting process is successful in one of the tape drives 211, 221, for an and report of the demounting command, a normal end is reported in step S910, generation of any demounting errors is not recognized in the host system 3, and the process is continued.

Figure 7:
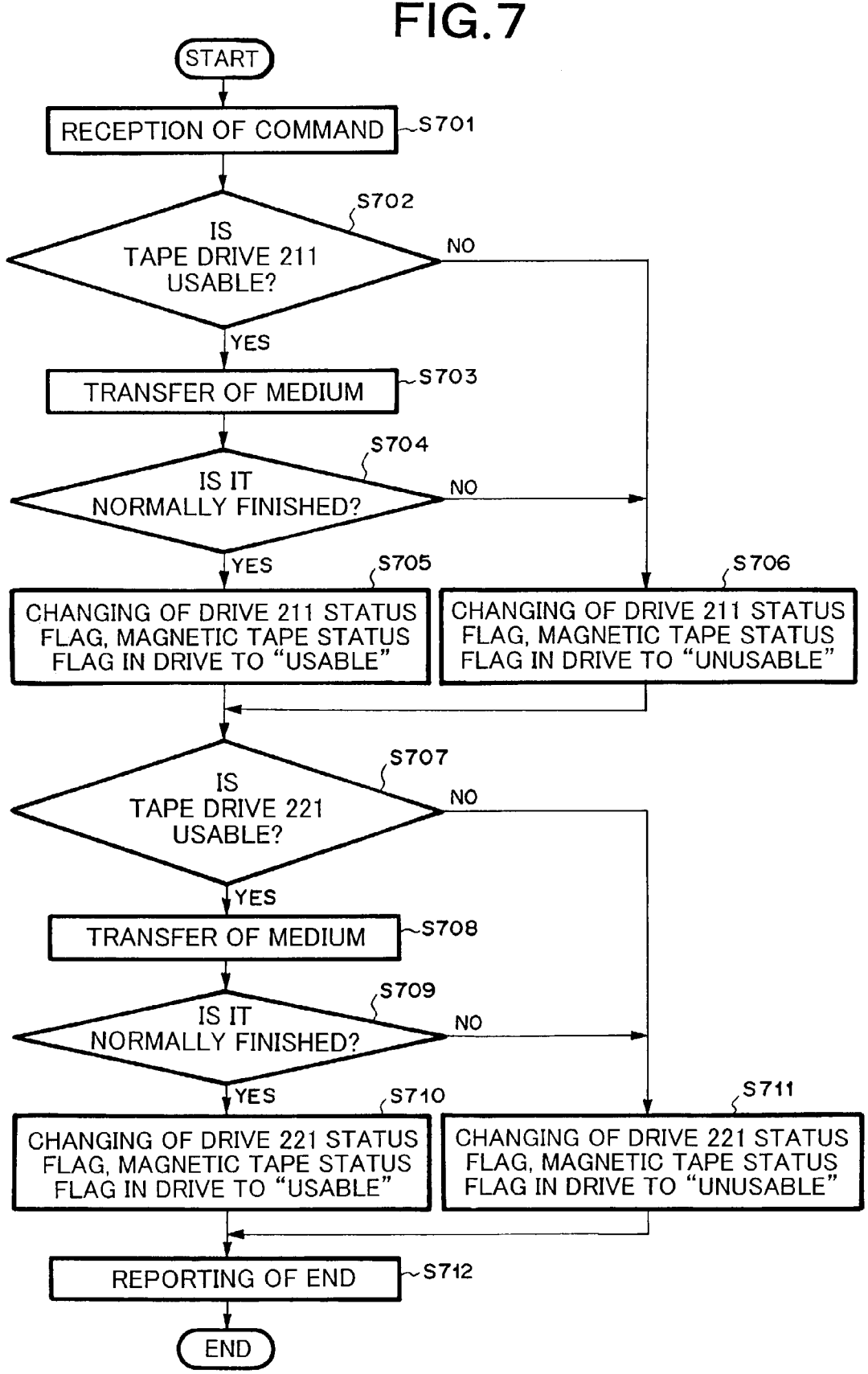
FIG. 7 is a flowchart showing an operation during mounting of a magnetic tape medium according to the embodiment 2 of the present invention.
Figure 9:
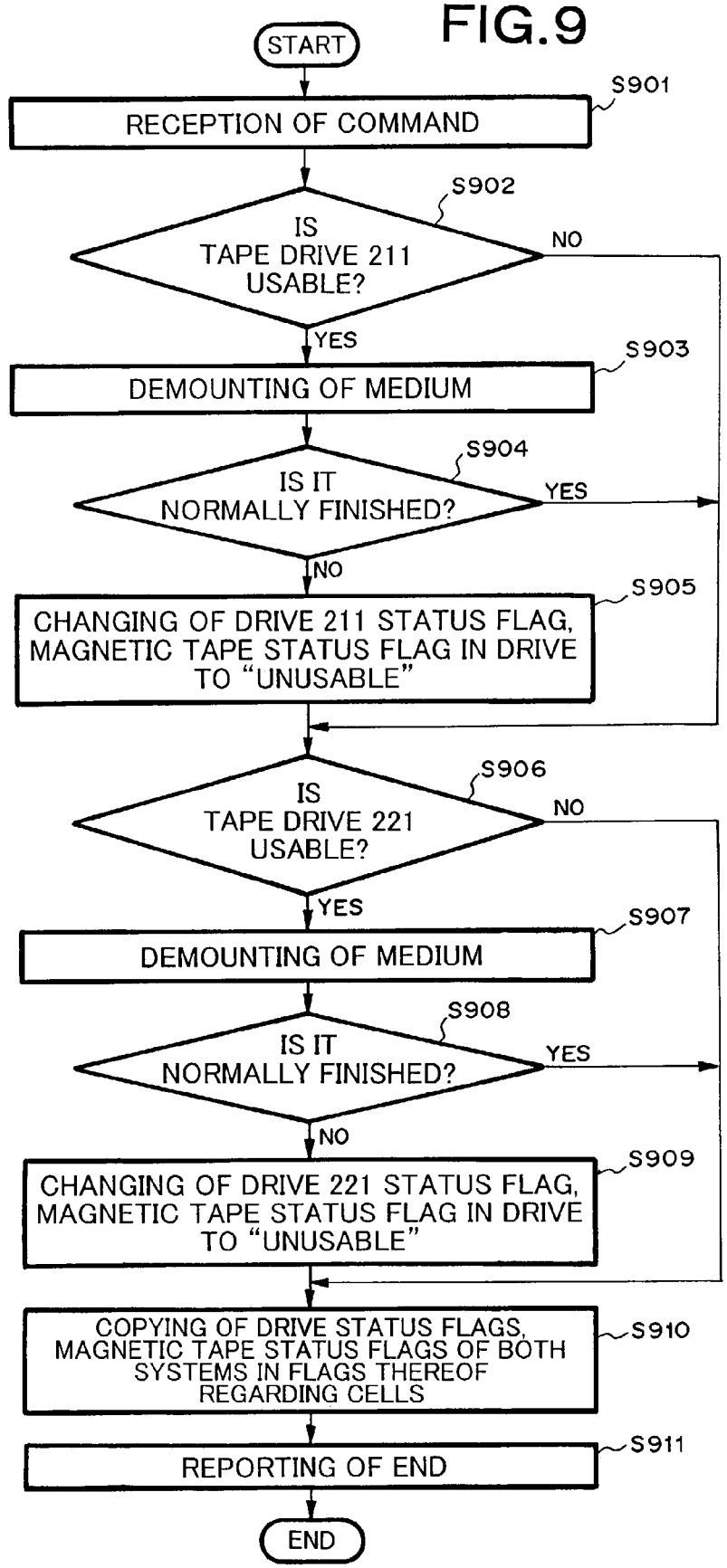
FIG. 9 is a flowchart showing an operation during demounting of the magnetic tape medium according to the embodiment 2 of the present invention.

By repeating the process of the flowcharts of FIGS. 7 to 9, if a trouble occurs in the tape drive during the process, without using the trouble-generated tape drive, the process is continued while maintaining a degraded status by only the tape drive which can be operated normally. For a trouble such as a data error conceivably caused by the magnetic tape medium, the magnetic tape medium is demounted, and the process is continued while maintaining the degraded status until information indicating the error generation history of the magnetic tape medium in the physical resource management section 11 is initialized.

According to the embodiment, the drive status flags 401, 402 of the tape drives 211, 221, the magnetic tape status flags 403, 404 indicating the error generation history of the magnetic tape media loaded on the tape drives, and the cell status flag groups 405, 406 regarding the success/failure of data writing in the media stored in the magazine are always held in the physical resource management section 11, and the content of the physical resource management section 11 is displayed to the outside by the physical resource status display section 13. The two magnetic tape devices 21, 22 are recognized logically as one magnetic tape device from the host system 3. The statuses in the physical magnetic tape devices 21, 22 are displayed by the physical resource status display section 13, whereby completion of the duplex writing in the magnetic tape, or which cell of the magazine the magnetic tape medium is stored in where normal data is written if failed is notified to the operator or the maintenance engineer.

As described above, in the information recorder having the mirroring function, even if the two magnetic tape devices of autochanger types are physically connected, by managing the error generation status of the magnetic tape device, the error generation history of the loaded magnetic tape medium, and the error generation history of the magnetic tape medium stored in the magazine, without notifying the generation of an error in one magnetic tape device, the process can be continued in a degraded status until the operator removes the magazine at the time of a trouble of the tape drive or until the magnetic tape medium is replaced at the time of a trouble of the magnetic tape medium. Accordingly, the interruption of the process in the host system 3 can be prevented to improve availability. Especially, in the magnetic tape device of the autochanger type, a chance of operator intervention is small because the plurality of magnetic tape media are housed in the magazine and handled, but it is possible to prevent the interruption of the process in the host system 3 for a period until the operator intervention such as magazine detachment.

Moreover, the error generation disables duplexing of the magnetic tape medium. However, in the magnetic tape device of the autochanger type where the magazine is replaced by the operator or the maintenance engineer, the physical resource status display section is disposed to notify presence of an error generation status and success/failure of duplexing completion of the medium to such an operator. Thus, it is possible to clearly identify a writing-failed magnetic tape medium and a normally written magnetic tape medium, whereby handling of a wrong medium in operation can be prevented.

[Embodiment 3]

Next, as an embodiment 3 of the present invention, description will be made of a method for controlling the information recorder described above with reference to the embodiment 2, which includes an automatic generation function of a copied medium of a magnetic tape medium where duplexing fails due to a trouble conceivably caused by the magnetic tape medium by using the spare magnetic tape medium stored beforehand in the magazine.

In the embodiment, it is assumed that a cell number 5 of a magazine which can house 6 rolls of magnetic tape media is a cell where the spare medium is housed. It is also assumed that a plurality of magnetic tapes are not processed continuously, a data writing process from the host system 3 is completed at the time of completion of a process of one roll of a magnetic tape, and a demounting command is issued to start a copying process of the magnetic tape medium. However, these are conditions assumed for explaining the embodiment, and a storage position of the spare medium and a chance of copying the magnetic tape medium which duplexing fails due to a medium trouble may be given under any conditions.

As described above with reference to the embodiment 2, a process in the information recorder to which the magnetic tape device of the autochanger type is classified into three, i.e., a mounting process of a magnetic tape medium, a data writing process, and a demounting process of the magnetic tape medium. Among these, the mounting process of the magnetic tape medium, the data writing process, and initialization of the physical resource management section when the magazine is loaded are completely similar to those of the embodiment 2, and thus description thereof will be omitted.

Figure 11:
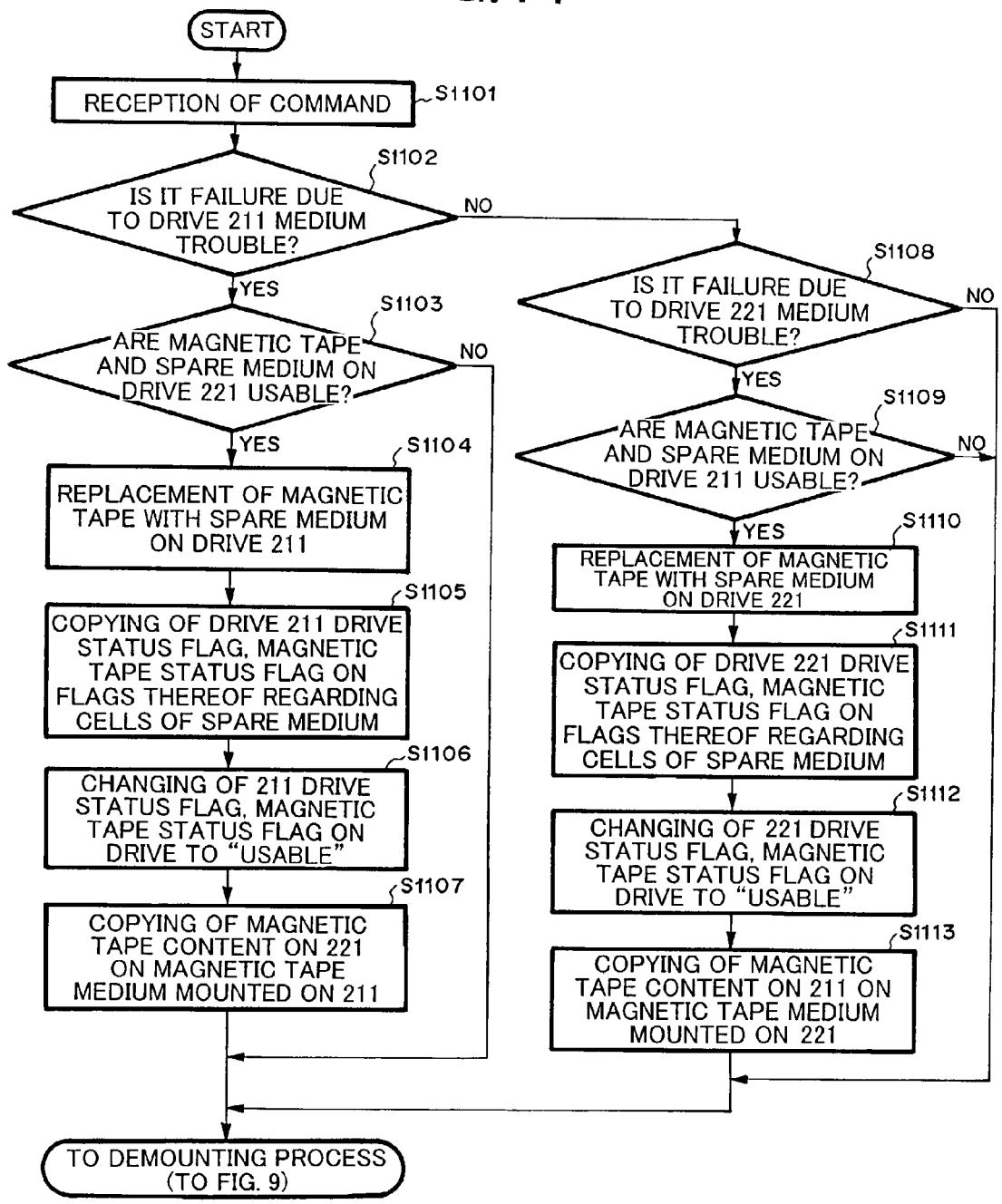
FIG. 11 is a flowchart showing an operation during mounting of a magnetic tape medium according to the embodiment 3 of the present invention.

The demounting process of the magnetic tape medium will be described by referring to the block diagrams of FIGS. 5 and 6 and the flowcharts of FIGS. 10 and 11.

The host system 3 finishes writing in the loaded magnetic tape medium, and issues a demounting command together with a cell number in the magazine to which the magnetic tape medium is returned to the information recorder 1. Then, this demounting command is received/interpreted through the host interface control section 15 (step S1101). Subsequently, the microprogram processing section 14 refers to the drive status flag 401 and the magnetic tape status flag 403 in the physical resource management section 11 to investigate whether a magnetic tape medium mounted on the tape drive 211 is a magnetic tape in which writing fails due to a medium trouble or not (step S1102). The drive status flags 401, 402 indicating statues of the tape drives 211, 221 managed by the physical resource management section 11, and the magnetic tape status flags 403, 404 indicating error generation history of the magnetic tape media loaded on the tape drives 211, 221 are combined to show processing results of the magnetic tape as shown in FIG. 10. If the drive status flag 401 of the drive 211 in the physical resource management section 11 is "usable", and the magnetic tape status flag 403 indicating the error generation history information of the loaded magnetic tape medium is "unusable", it is determined to be a magnetic tape in which writing fails due to the medium trouble (step S1102, YES), and a copying process of the magnetic tape medium is started.

In the copying process, first, investigation is made as to whether the drive status flag 402 of the drive 221 in the physical resource management section 11 and the magnetic tape status flag 404 indicating the error generation history information of the loaded magnetic tape medium are both "usable" or not. Then, a drive status flag and a magnetic tape status flag corresponding to a cell #5 storing a spared medium are read from the flag group 405 regarding the magnetic tape medium stored in the cell of the magazine 213, and investigation is made as to whether the drive status information and the error generation history information of the magnetic tape at the time of medium writing are both "usable" or not (step S1103). That is, it is verified that writing in the magnetic tape loaded on the tape drive 221 which is a copy origin is normally completed, the magnetic tape medium stored in the spare medium cell of the magazine 213 is not used after the magazine is loaded, and the drive status information and the error generation history information of the magnetic tape medium at the time of this medium writing are both in initial statuses. After these conditions are satisfied, the magnetic tape medium mounted on the tape drive 211 is replaced with a spare magnetic tape medium stored in the cell #5 of the magazine 213 (step S1104). This replacement of the magnetic tape medium is equivalent to the combination of the demounting and mounting processes of the magnetic tape medium described above with reference to the embodiment 2. Thus, the drive status flag 401 indicating the status of the tape drive 211 and the magnetic tape status flag 403 indicating the error generation history of the magnetic tape medium loaded on the tape drive 211 are copied on a drive status flag and a magnetic tape status flag of the cell number storing the spare medium of the magazine 213 in the flag group 405 (step S1105). The drive status flag 401 indicating the status of the tape drive 211 and the magnetic tape status flag 403 indicating the status of the magnetic tape medium loaded thereon are both initialized to statuses indicating "usable" (step S1106). After these operations, the magnetic tape medium mounted on the tape drive 221 is rewound, and data reading from the tape drive 221 to the buffer 12 and data writing from the buffer 12 to the tape drive 211 are repeated to copy data on the spare medium mounted on the tape drive 211 (step S1107). Upon completion of the copying process, a demounting process similar to normal demounting is carried out. Since this demounting process is similar to that after step S902 of FIG. 9 described above with reference to the embodiment 2, description thereof will be omitted.

If it is determined in step S1103 that the conditions for starting the copying process are not satisfied (step S1103, NO), the copying process cannot be carried out. Thus, the process is canceled, and the demounting process is carried out.

If it is determined in step S1102 that the magnetic tape medium mounted on the tape drive 211 is not a magnetic tape in which writing fails due to a medium trouble (step S1102, NO), subsequently, determination is made based on a criterion similar to that of step S1102 as to whether the magnetic tape medium mounted on the tape drive 221 is a magnetic tape in which writing fails due to a medium trouble or not (step S1108). If it is determined to be the magnetic tape in which wiring fails due to the medium trouble (step S1108, YES), a copying process of the magnetic tape medium is started. First, investigation is made as to whether the drive status flag 401 of the drive 211 in the physical resource management section 11 and the magnetic tape status flag 403 indicating the error generation history information of the loaded magnetic tape medium are both "usable" or not. Further, a drive status flag and a magnetic tape status flag corresponding to a cell #5 storing a spared medium are read from the flag group 406 regarding the magnetic tape medium stored in the cell of the magazine 223, and investigation is made as to whether these are both "usable" or not (step S1109). That is, it is verified that writing in the magnetic tape of the tape drive 211 which is a copy origin is normally completed, the magnetic tape medium stored in the spare medium cell of the magazine 223 is usable. After these conditions are satisfied, the magnetic tape medium mounted on the tape drive 221 is replaced with a spare magnetic tape medium stored in the cell #5 of the magazine 223 (step S1110). The drive status flag 402 indicating the status of the tape drive 221 and the magnetic tape status flag 404 indicating the error generation history of the magnetic tape medium loaded on the tape drive 221 are copied on a drive status flag and a magnetic tape status flag of the cell number storing the spare medium of the magazine 223 in the flag group 406 (step S1111). The drive status flag 402 indicating the status of the tape drive 221 and the magnetic tape status flag 404 indicating the status of the magnetic tape medium loaded thereon are both initialized to statuses indicating "usable" (step S1112). After these operations, the magnetic tape medium mounted on the tape drive 211 is rewound, and data is copied on the spare medium mounted on the tape drive 221 (step S1113). Upon completion of the copying process, a demounting process similar to normal demounting is carried out.

If it is determined in step S1109 that the conditions for starting the copying process are not satisfied (step S1109, NO), the demounting process is immediately carried out.

As described above, in the information recorder having the mirroring function of the embodiment 2 where the two magnetic tape devices of the autochanger type are physically connected, the spare medium is stored in the magazine and, if duplexing fails due to an error conceivably caused by the medium trouble, the data is copied on the spare magnetic tape medium by taking a pre-specified chance, whereby the process is temporarily continued in the degraded status to prevent the interruption of the process in the host system 3, and the duplexing of the magnetic tape medium is automatically tried until the operator takes out the magazine. Thus, it is possible to reduce a possibility of duplexing failures.

[Embodiment 4]

For the foregoing three embodiments, the control method has been described on the assumption that the information recorder is designed to automatically create two rolls of original and duplicate magnetic tape media in the magnetic tape device logically seen to be one from the host system 3. Next, description will be made of an embodiment of a system configuration not designed to create two rolls of original and duplicate media by using the information recorder of the present invention.

Figure 12:
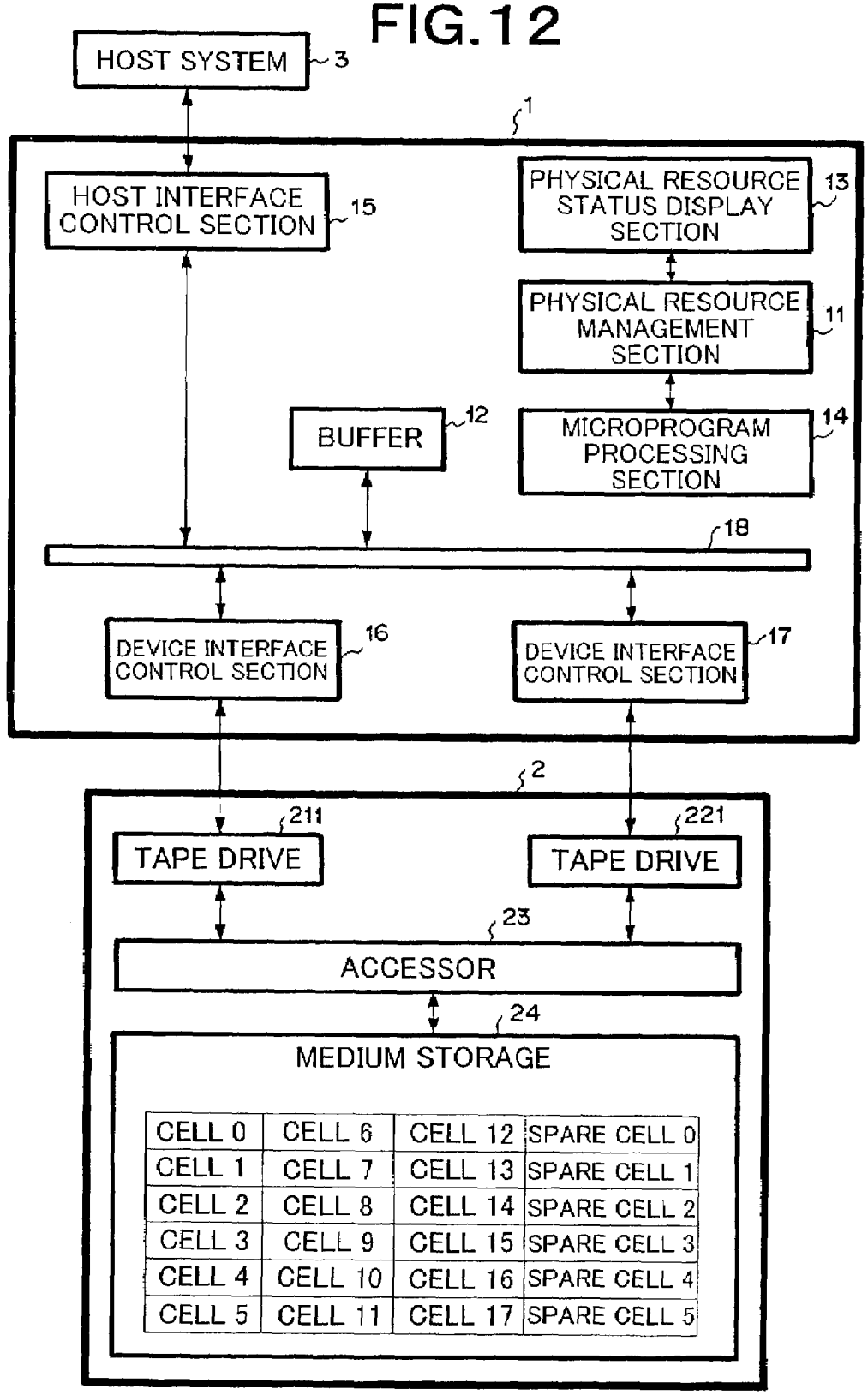
FIG. 12 is a block diagram showing a constitution of an information recorder according to an embodiment 4 of the present invention.

FIG. 12 is a block diagram showing an embodiment 4 of a system configuration using the information recorder of the present invention. The embodiment adopts a constitution where a magnetic tape library device is connected to the information recorder. This magnetic tape library device 2 includes two tape drives 211, 221, a medium storage 24 which can house a plurality of media, and an accessor 23 for carrying a medium between the medium storage 24 and the tape drives 211, 221. In the embodiment, it is assumed that cells for housing spare magnetic tape media beforehand are prepared by 6 rolls in the medium storage 24.

In FIG. 12, functions of a buffer 12, a physical resource status display section 13, a microprogram 14, a host interface control section 15, device interface control sections 16, 17, and an internal bus 18 constituting the information recorder 1 are similar to those of the embodiments 1 to 3, and thus description thereof will be omitted.

Figure 13:
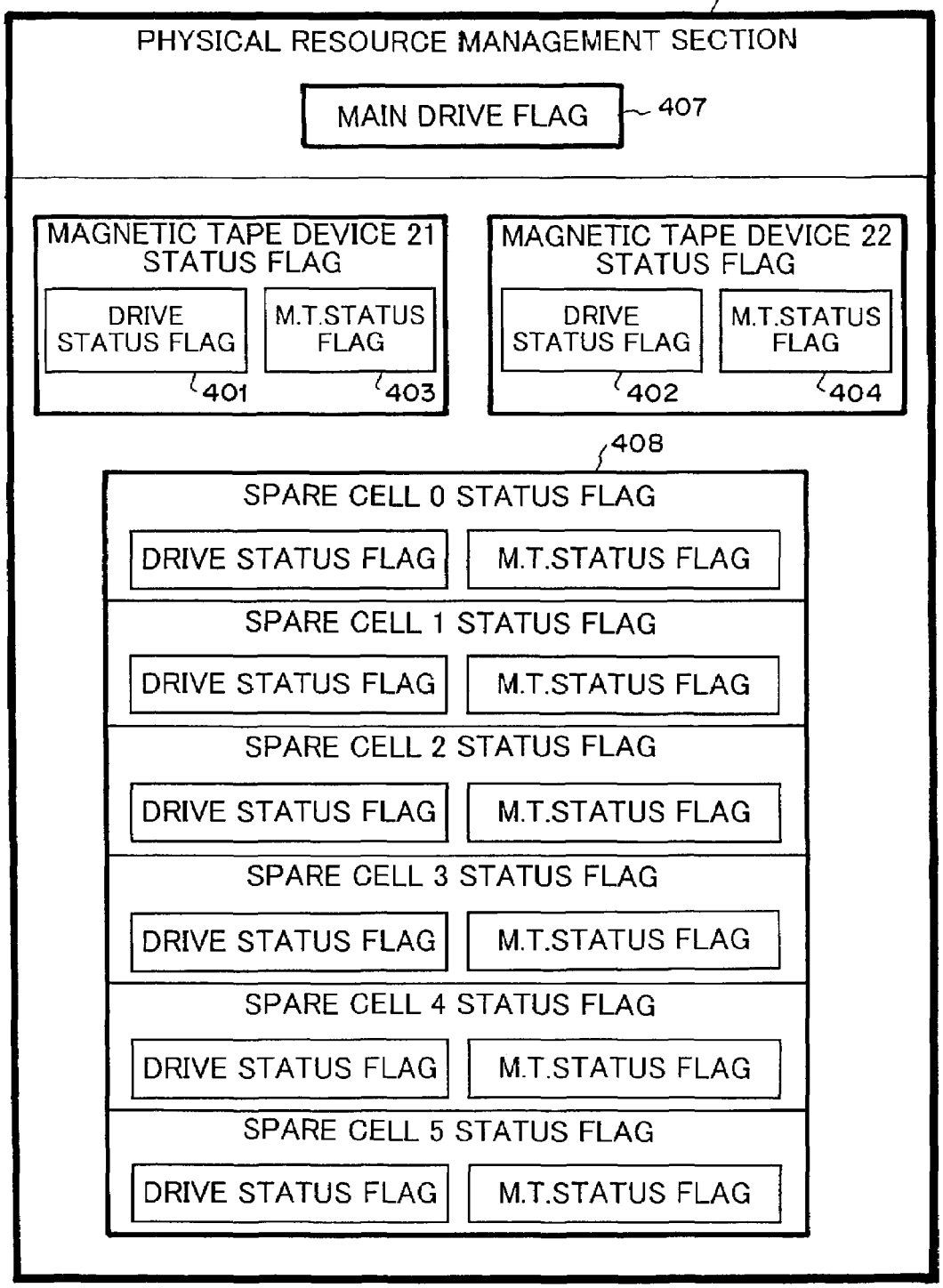
FIG. 13 is a view showing a flag held by a physical resource management section of the information recorder of the embodiment 4 of the present invention.

As shown in FIG. 13, the physical resource management section 11 has drive status flags 401, 402 indicating statuses of the tape drives 211, 221, magnetic tape status flags 403, 404 indicating error generation history of magnetic tape media loaded on the tape drives 211, 221, a main drive flag 407 for identifying tape drives used as main drives in the two tape drives 211, 221, and a spare cell status flag group 408. The cell status flag group 408 comprises a drive status flag indicating a status of the tape drive at the time of writing in the magnetic tape medium stored in the cell for the spare magnetic tape medium reserved in the medium storage 24, and a magnetic tape status flag indicating error generation history of the magnetic tape medium. According to the embodiment, when a new spare medium is stored in the cell for the spare magnetic tape medium in the medium storage 24, the magnetic tape status flag regarding the magnetic tape medium corresponding to the cell is initialized to a value indicating "usable". When magnetic tape media are loaded on the tape drives 211, 221, the magnetic tape status flags 403, 404 regarding the magnetic tape media loaded thereon are both initialized to values indicating "usable". The main drive flag 407 always indicates one of the tape drives 211, 221, and the tape drive indicated by this flag 407 is handled as a main drive while the other is handled as a subdrive.

According to the embodiment, since the magnetic tape library is connected, operations such as mounting and demounting of a magnetic tape medium are carried out in accordance with commands from the host system 3. Thus, the process in the information recorder is classified into three kinds, i.e., a mounting process of a magnetic tape medium, a data writing process, and a demounting process of the magnetic tape medium, as described in the embodiment 2. Among these operations, the data writing operation is completely similar to that of the embodiment 2, and thus description thereof will be omitted.

Figure 14:
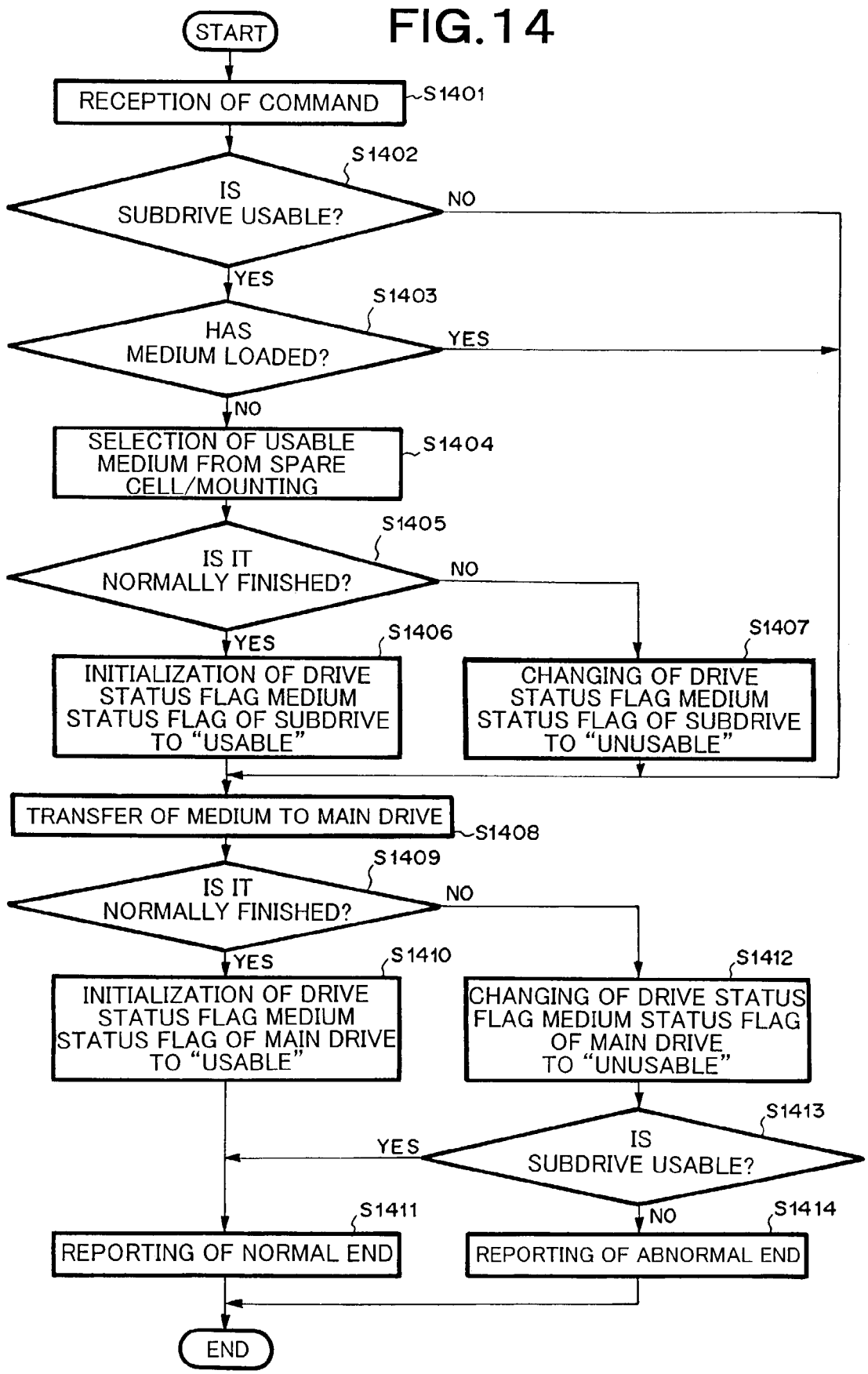
FIG. 14 is a flowchart showing an operation during mounting of a magnetic tape medium according to the embodiment 4 of the present invention.
Figure 15:
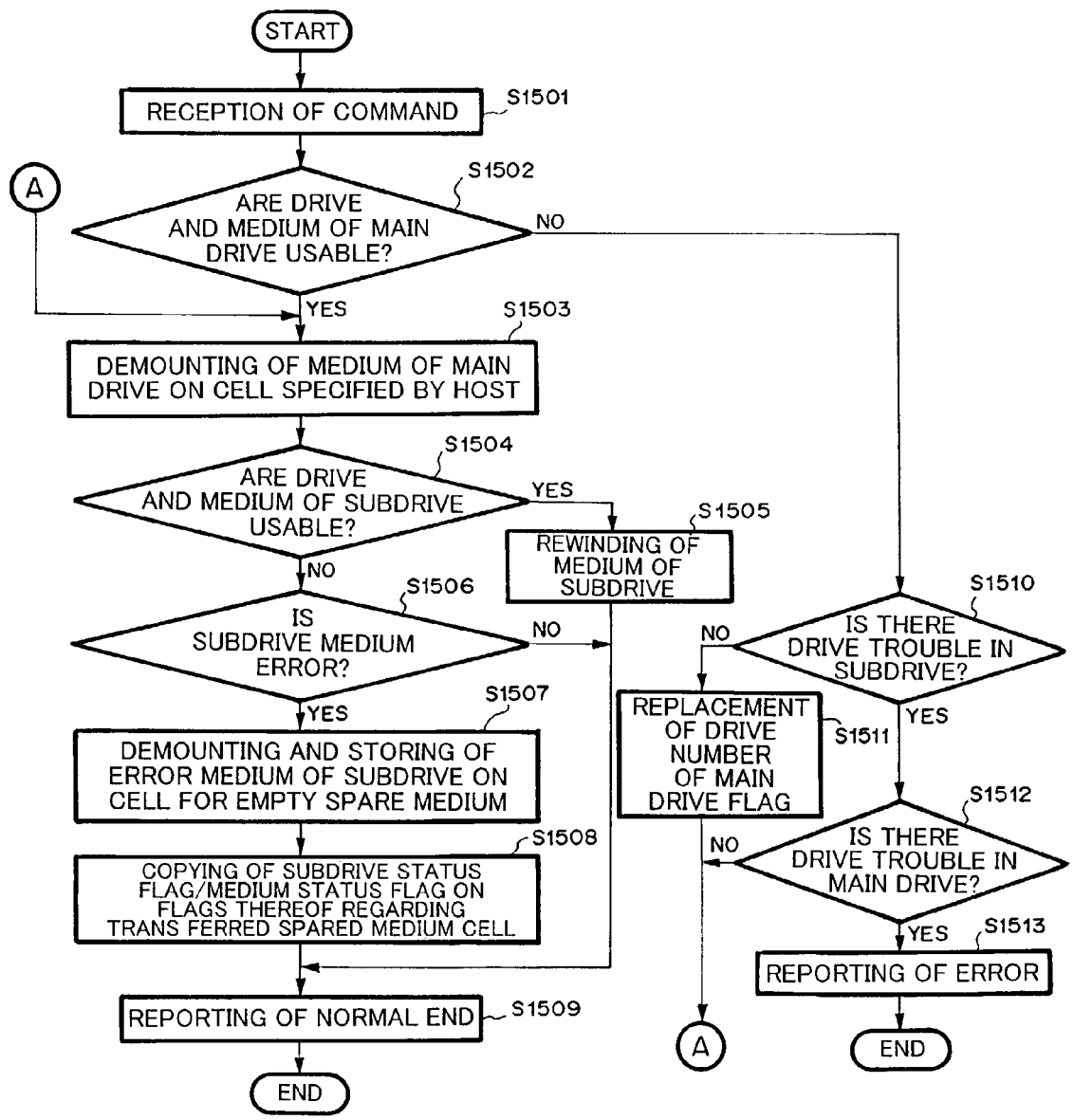
FIG. 15 is a flowchart showing an operation during demounting of the magnetic tape medium according to the embodiment 4 of the present invention.
Figure 16:
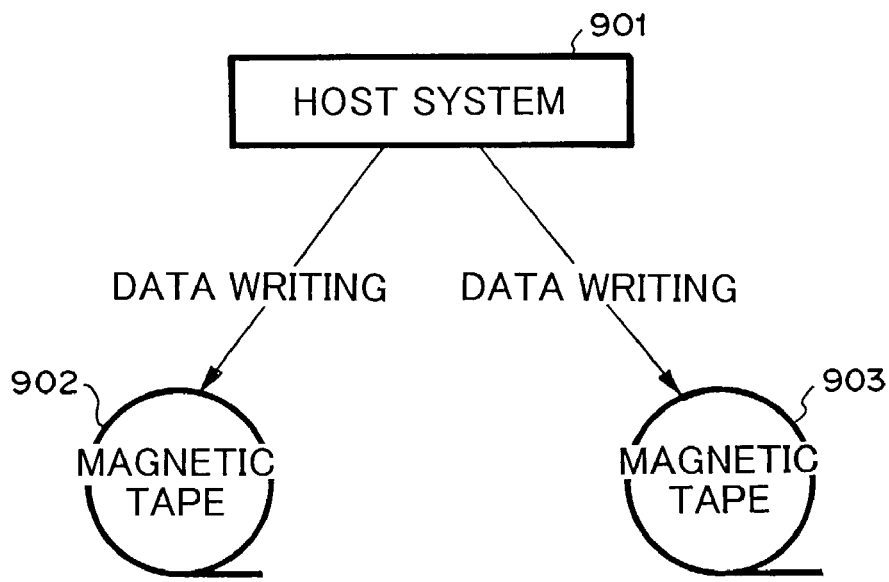
FIG. 16 is a first view showing a constitution of a conventional example.
Figure 17:
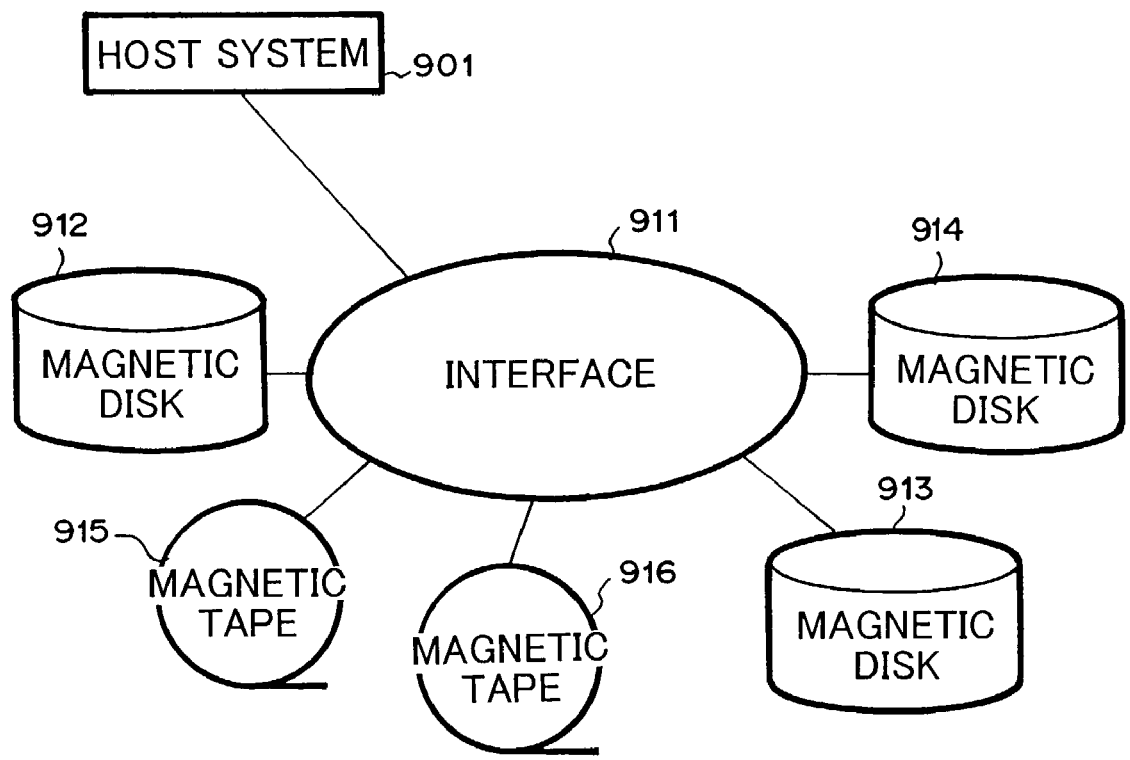
FIG. 17 is a second view showing a constitution of a conventional example.

Hereinafter, processes during mounting of the magnetic tape media, data writing and demounting will be described by referring to block diagrams of FIGS. 12 and 13 and flowcharts of FIGS. 14 and 15.

In the description, for convenience of explanation, it is assumed that the process is started in a status where the tape drive 211 is a main drive, and the tape drive 221 is a subdrive.

The mounting of the magnetic tape medium is started after the host system 3 issues a mounting command together with a cell number in the medium storage 24 from which the magnetic tape medium is taken out to the information recorder 1. This mounting command is received/interpreted through the host interface control section 15 (step S1401). Subsequently, the microprogram processing section 14 refers to the main drive flag 407 in the physical resource management section 11 to decide a subdrive, and refers to the drive status flag 402 indicating a status of the subdrive to investigate whether the subdrive is usable or not. If usable (step S1402, YES), it investigates whether a magnetic tape has been loaded or not on the subdrive (step S1403). If any magnetic tape medium is not loaded (step S1403, NO), the microprogram processing section 14 searches the flag group 408 regarding a medium stored in the spare magnetic tape medium cell of the medium storage 24 to obtain a usable magnetic tape medium, that is, a medium in which the drive status flag of the tape drive and the magnetic tape status flag indicating error generation history of the magnetic tape medium at the time of writing are both in initial statuses, i.e., "usable", and instructs the accessor 23 through the device interface control section 16 to mount the spare medium from the cell storing it to the subdrive 221 (step S1404). If the mounting of the spare magnetic tape medium is normally completed (step S1405, YES), the drive status flag 402 indicating the status of the subdrive and the magnetic tape status flag 404 indicating the status of the magnetic tape medium loaded thereon are both set to values indicating "usable" (step S1406). If the mounting of the spare magnetic tape medium fails (step S1405, NO), the drive status flag 402 indicating the status of the subdrive and the magnetic tape status flag 404 indicating the status of the magnetic tape medium loaded thereon are both set to values indicating "unusable" (step S1407).

Upon completion of the series of mounting operations to the subdrive 221, or if the magnetic tape medium has been loaded on the subdrive 221 to be in a usable status (step S1402, No), the magnetic tape medium stored in the cell of the medium storage 24 instructed from the host system 3 is transferred to the main drive 211 and mounted (step S1408). If this mounting operation is normally completed (step S1409, YES), the drive status flag 401 indicating the status of the tape drive 211 and the magnetic tape status flag 403 indicating the status of the magnetic tape medium loaded thereon are both set to values indicating "usable" (step S1410), and a normal end is reported to the host system 3 (step S1411).

If the transfer and the mounting of the magnetic tape medium to the main drive 211 instructed from host system 3 are not normally carried out (step S1409, NO), the drive status flag 401 indicating the status of the tape drive 211 and the magnetic tape status flag 403 indicating the status of the magnetic tape medium loaded thereon are both set to values indicating "unusable" (step S1412). In this case, reference is made to the status 402 of the subdrive 221. If the subdrive 221 is usable (step S1413, YES), a normal end is reported to the host system 3 (step S1411). If the subdrive 221 is unusable (step S1413, NO), an abnormal end is reported to the host system 3 (step S1414).

Next, description will be made of a process of demounting the magnetic tape medium by referring to the flowchart of FIG. 15.

The demounting of the magnetic tape medium is started after the host system 3 finishes writing in the loaded magnetic tape medium, and issues a demounting command together with a cell number in the medium storage 24 to which the magnetic tape medium is returned to the information recorder 1.

This demounting command is received/interpreted through the host interface control section 15 (step S1501).

Subsequently, the microprogram processing section 14 refers to the main drive flag 407 in the physical resource management section 11 to decide a main drive, and refers to the drive information flag 401 indicating the status of the main drive 211 and the magnetic tape status flag 403 of the magnetic tape medium loaded thereon to investigate whether a process for the medium loaded on the main drive is normally completed or not. If writing is normally completed (step 1502, YES), the magnetic tape loaded on the main drive 211 is demounted, and transferred to the cell in the medium storage 24 instructed from the host system 3 (step S1503).

Then, reference is made to the drive status flag 402 indicating the status of the subdrive 221 and the magnetic tape status flag 404 indicating the status of the magnetic tape loaded thereon. If both flags show values indicating "usable" (step S1504, YES), the magnetic tape on the subdrive 221 is rewound (step S1505) to report a normal end to the host system 3 (step S1509). A copy of the magnetic tape medium of the main drive 211 is left on the magnetic tape medium of the subdrive 221. According to the embodiment, however, since duplexing of the magnetic tape medium is not a purpose, the copy becomes unnecessary after it is verified that the process in the main drive 211 is normally completed. Thus, it is kept loaded on the subdrive 221 as a mirroring medium when a writing process is carried out in the other magnetic tape medium.

If mirroring cannot be carried out in the subdrive 221 due to one trouble or another (step S1504, NO), determination is made based on the drive status flag 402 of the subdrive 221 and the magnetic tape status flag 404 of the magnetic tape medium loaded thereon as to whether it is a trouble of a drive or a trouble of a magnetic tape medium (step S1506). If the trouble of the magnetic tape medium is determined (step S1506, YES), there is a possibility of recovering mirroring by replacing the magnetic tape medium. Thus, for a later mounting process, the magnetic tape medium on the subdrive 221 is demounted, and transferred to the spare medium cell in the medium storage (step S1507). The drive status flag 402 of the subdrive 221 and the magnetic tape status flag 404 of the magnetic tape medium are copied on a drive status flag and a magnetic tape status flag corresponding to the transferred spare medium cell in the flag group 408 (step S1508), and then a normal end is reported to the host system 3 (step S1509).

If it is determined that mirroring cannot be carried out due to a trouble of the tape drive (step S1506, NO), there is no possibility of resuming the mirroring even if the magnetic tape medium is replaced. Thus, a process such as demounting of the medium is not carried out, and a normal end is reported to the host system 3 (step S1509).

If it is determined that the process of the medium loaded on the main drive is not normally completed (step S1502, NO), reference is made to the drive status flag 402 indicating the status of the subdrive 221 and the magnetic tape status flag 404 of the magnetic tape medium loaded thereon to investigate whether writing in the medium loaded on the subdrive 221 is normally ended or not (step S1510).

If the writing in the medium loaded on the subdrive 221 is normally completed or if an error is generated due to a medium trouble (step S1510, NO), the main drive indicated by the main drive flag is changed to the tape drive 221 (step S1511), and the magnetic tape medium subjected to mirroring on the tape drive 221 which been treated as the subdrive is demounted, and transferred to the cell instructed from the host system 3 (step S1503 . . . ). Thereafter, the tape drive 221 is treated as the main drive.

If the writing in the medium loaded on the subdrive 221 cannot be completed due to a drive trouble (step S1510, YES), comparison is made with the status of the main drive 211. If the main drive 211 and the subdrive 221 both have troubles (step S1512, YES), since the instruction from the host system 3 can be executed in neither of the drives, an error report is made (step S1513) to finish the process. If mirroring cannot be carried out in the main drive 211 due to a trouble caused by the magnetic tape medium (step S1512, NO), while maintaining the tape drive 211 as the main drive, the magnetic tape medium on the tape drive 211 is demounted and transferred to the cell instructed from the host system 3 (step S1503 . . . ).

As described above, in the information recorder having the mirroring function, the magnetic tape library is connected, and one of the two physically connected tape drives is treated as the main drive while the other is treated as the subdrive, making the tape drives seem one logically from host system 3. Thus, even if medium duplexing is not a purpose as in the case of the embodiments 1 to 3, one of the tape drives is treated as a redundant drive, and the process can be continued in a degraded status without notifying error generation in one tape drive. Therefore, interruption of the process in the host system can be prevented to improve availability.

The embodiment has been described by taking the example of the duplexing information recorder where the number of drives is two. However, the present invention can be applied to a duplexing information recorder where the number of drives is three.

As described above, in the information recorder having the mirroring function, by managing the error generation statuses of the magnetic tape devices, two being present physically, the process can be continued in the degraded status without notifying the generation of an error in one magnetic tape device. Accordingly, the interruption of the process in the host system 3 can be prevented to improve availability. Moreover, the error generation disables duplexing of the magnetic tape medium. However, in the removable medium such as a magnetic tape which is removed by the operator or the maintenance engineer, the physical resource status display section is disposed to notify presence of an error generation status and success/failure of duplexing completion of the medium to such an operator. Thus, it is possible to clearly identify a writing-failed magnetic tape medium and a normally written magnetic tape medium, whereby handling of a wrong medium in operation can be prevented.

What is claimed is:

1. An information recorder for writing data instructed to be written from a host system in recording media of at least two drives, comprising:
    detection means for detecting a status of each drive and of a recording medium of each drive;
    cancellation means for canceling the writing of the data in a recording medium of a drive where an abnormality is detected or a drive having a recording medium where an abnormality is detected;
    continuation means for continuing the writing of the data in a recording medium of a drive that does not contain an abnormality and which has a recording medium where no abnormality is detected, and
    means for continuing the writing of the data without notifying the host system of the detected abnormality when there is at least one drive where no abnormality is detected and which has the recording medium where no abnormality is detected.

2. The information recorder according to claim 1, which further comprises display means for displaying that each drive and the recording medium of each drive are normal or abnormal.

3. The information recorder according to claim 1, wherein a plurality of recording media which can be specified by the host system are present to each drive;
    the detection means detects the status when the recording medium specified by the host system is mounted on or demounted from the drive;
    the cancellation means cancels the writing of the data in the recording medium of the drive where an abnormality is detected, the drive of the recording medium where an abnormality is detected, or the drive where an abnormality is detected during the mounting or demounting; and
    the continuation means continues the writing of the data in the recording medium of the following drive without notifying any abnormality to the host system, as long as there is at least one drive where any abnormality is not detected and which has the recording medium where any abnormality is not detected and where any abnormality is not detected during the mounting or demounting.

4. The information recorder according to claim 3, which further comprises:
    means for replacing, with a spare recording medium, the recording medium where an abnormality is detected, and
    means for copying the data on the spare recording medium, with which the recording medium where an abnormality is detected is replaced, from the recording medium, where an abnormality is detected, of a drive other than the drive of the recording medium where an abnormality is detected.

5. The information recorder according to claim 1, wherein a plurality of recording media which can be specified by the host system are present to each drive set as a main drive; a plurality of spare recording media which cannot be specified by the host system are present to the other drive set as a subdrive;
    the detection means detects the status when the recording medium specified by the host system is mounted on or demounted from the main drive and when the spare recording medium is mounted on or demounted from the subdrive;
    the cancellation means cancels the writing of the data in the recording medium of the drive where an abnormality is detected, the drive of the recording medium where an abnormality is detected, or the drive where an abnormality is detected during the mounting or demounting; and
    the continuation means continues the writing of the data in the recording medium of the following drive without notifying any abnormality to the host system, as long as there is at least one drive where any abnormality is not detected and which has the recording medium where any abnormality is not detected and where any abnormality is not detected during the mounting or demounting;
    the information recorder further comprising drive replacement means for replacing the main drive with the subdrive where any abnormality is not detected, when an abnormality is detected in the main drive but any abnormality is not detected in the subdrive; and
    spare recording medium replacement means for replacing, with another spare recording medium, the spare recording medium where an abnormality is detected, when an abnormality is detected in the spare recording medium mounted on the subdrive.

6. An information recording method for writing data instructed to be written from a host system in recording media of at least two drives, comprising:
    detecting a status of each drive and of a recording medium of each drive;
    canceling the writing of the data in a recording medium of a drive where an abnormality is detected or a drive having a recording medium where an abnormality is detected; and
    continuing the writing of the data in a recording medium of a drive that does not contain an abnormality and which has a recording medium where no abnormality is detected,
    wherein, the host system is not notified of the detected abnormality and the writing of the data is continued when there is at least one drive where no abnormality is detected and which has the recording medium where no abnormality is detected.

7. The information recording method according to claim 6, further comprising displaying that each drive and the recording medium of each drive are normal or abnormal.

8. The information recording method according to claim 6, wherein a plurality of recording media which can be specified by the host system are present to each drive;
   detecting the status when the recording medium specified by the host system is mounted on or demounted from the drive;
   cancelling the writing of the data in the recording medium of the drive where an abnormality is detected, the drive of the recording medium where an abnormality is detected, or the drive where an abnormality is detected during the mounting or demounting; and
   continuing the writing of the data in the recording medium of the following drive without notifying any abnormality to the host system, as long as there is at least one drive where any abnormality is not detected and which has the recording medium where any abnormality is not detected and where any abnormality is not detected during the mounting or demounting.

9. The information recording method according to claim 8, which further comprises:
   replacing, with a spare recording medium, the recording medium where an abnormality is detected, and
   copying the data on the spare recording medium, with which the recording medium where an abnormality is detected is replaced, from the recording medium, where an abnormality is detected, of a drive other than the drive of the recording medium where an abnormality is detected.

10. The information recording method according to claim 6, wherein
   a plurality of recording media which can be specified by the host system are present to each drive set as a main drive; a plurality of spare recording media which cannot be specified by the host system are present to the other drive set as a subdrive;
   detecting the status when the recording medium specified by the host system is mounted on or demounted from the main drive and when the spare recording medium is mounted on or demounted from the subdrive;
   canceling the writing of the data in the recording medium of the drive where an abnormality is detected, the drive of the recording medium where an abnormality is detected, or the drive where an abnormality is detected during the mounting or demounting; and
   continuing the writing of the data in the recording medium of the following drive without notifying any abnormality to the host system, as long as there is at least one drive where any abnormality is not detected and which has the recording medium where any abnormality is not detected and where any abnormality is not detected during the mounting or demounting;
   replacing the main drive with the subdrive where any abnormality is not detected, when an abnormality is detected in the main drive but any abnormality is not detected in the subdrive; and
   replacing, with another spare recording medium, the spare recording medium where an abnormality is detected, when an abnormality is detected in the spare recording medium mounted on the subdrive.

11. A computer readable medium recording thereon a program for enabling a computer to execute an information recording method for writing data instructed to be written from a host system in recording media of at least two drives, the method comprising:
   detecting a status of each drive and of a recording medium of each drive;
   canceling the writing of a data in the recording medium of a drive where an abnormality is detected or a drive having a recording medium where an abnormality is detected; and
   continuing the writing of the data in a recording medium of a drive tat does not contain an abnormality and which has a recording medium where no abnormality is detected,
   wherein, the host system is not notified of the detected abnormality and the writing of the data is continued when there is at least one drive where no abnormality is detected and which has the recording medium where no abnormality is detected.

12. An information recorder connected to first and second drives for writing data instructed to be written from a host system, the first and second drives being connected to recording media, respectively, comprising:
   a detection element which detects a status of the first and second drive and of a recording medium of each drive; and
   an instructions element which instructs the first and second drives to write the same data in the corresponding recording medium, and instructs the first drive to cancel the writing of the data in the recording medium, when an abnormality is detected by the detection element in the first drive or the recording medium connected to the first drive,
   wherein the instruction element does not notify any abnormality to the host system during writing the data.

13. The information recorder according to claim 12, further comprising:
   a display element which displays whether each drive and the recording medium of each drive are normal or abnormal based on the detection result of the detection element.

14. The information recorder according to claim 12,
   wherein a plurality of recording media which can be specified by the host system are associated with the first and second drive;
   wherein the detection element further detects the status when the recording medium specified by the host system is mounted on or demounted from the first and second drive;
   wherein the instruction element, when an abnormality is detected during the mounting and demounting by the detection element in the first drive, further instructs the first drive to cancel the writing of the data in the recording medium; and
   wherein the instruction element does not notify any abnormality to the host system during mounting or demounting the recording medium.

15. The information recorder according to claim 14, further comprising:
   a replacing element which replaces, with a spare recording medium, the recording medium, which is connected to the first drive, where an abnormality is detected; and
   a copying element which copies the data stored on the recording medium of the second drive to the spare recording medium which is replaced with the recording medium connected to the first drive by the replacing element.

16. The information recorder according to claim 12,
wherein a plurality of recording media which can be specified by the host system are associated with the first drive as a main drive;
wherein a plurality of spare recording media which cannot be specified by the host system are associated with the second drive as a subdrive;
wherein the detection element detects the status when the recording medium specified by the host system is mounted on or demounted from the main drive and when the spare recording medium is mounted on or demounted from the subdrive; and
wherein the instruction element instructs the main drive and the subdrive to write the same data in the recording medium and the spare recording medium, respectively, instructs the main drive to cancel the writing of the data in the recording medium when an abnormality is detected during the writing the data and mounting or demounting by the detection element in the main drive or the recording medium connected to the main drive, and instructs the main drive to replace the main drive with the subdrive.

17. The information recorder according to claim 16,
wherein the instruction element instructs the subdrive to rewind the spare recording medium when the main drive and the subdrive complete the writing of the data; and
wherein the instruction element instructs the subdrive to replace the spare recording medium in which an abnormality is detected with another spare recording medium, when the main drive completes the writing of the data and an abnormality is detected by the detection element in the spare recording medium.

18. An information recording method of an information recorder connected to first and second drives for writing data instructed to be written from a host system in recording media, the first and second drives being connected to recording media, respectively, comprising:
 detecting a status of the first and second drive and of a recording medium of each drive;
 instructing the first and second drives to write the same data to the corresponding recording medium; and
 instructing, when an abnormality is detected in the first drive or the recording medium connected to the first drive, the first drive to cancel the writing of the data in the recording medium,
 wherein the information recorder does not notify any abnormality to the host system during writing of the data.

19. The information recording method according to claim 18,
 wherein a plurality of recording media which can be specified by the host system are associated with the first and second drive;
 wherein the information recording method further comprises:
 detecting the status when the recording medium specified by the host system is mounted on or demounted from the first and second drive; and
 instructing, when an abnormality is detected during the mounting and demounting the recording media in the first drive, the first drive to cancel the writing of the data in the recording medium; and
 wherein the information recorder does not notify any abnormality to the host system during mounting or demounting the recording medium.

20. The information recording method according to claim 18, further comprising:
 displaying that each drive and the recording medium of each drive are normal or abnormal based on the detection result.

21. The information recording method according to claim 19, further comprising:
 replacing, with a spare recording medium, the recording medium, which is connected to the first drive and where an abnormality is detected; and
 copying the data stored on the recording medium of the second drive to the spare recording medium which is replaced with the recording medium connected to the first drive.

22. The information recording method according to claim 18,
 wherein a plurality of recording media which can be specified by the host system are associated with the first drive as a main drive;
 wherein a plurality of spare recording media which cannot be specified by the host system are associated with the second drive as a subdrive;
 wherein the information recording method further comprises:
 detecting the status when the recording medium specified by the host system is mounted on or demounted from the main drive and when the spare recording medium is mounted on or demounted from the subdrive;
 instructing the main drive and the subdrive to write the same data in the recording medium and the spare recording medium, respectively; and
 instructing, when an abnormality is detected during the writing of the data, mounting or demounting in the main drive or the recording medium connected to the main drive, the main drive to cancel the writing of the data in the recording medium; and
 instructing the main drive to replace the main drive with the subdrive.

23. The information recording method according to claim 22, further comprising:
 instructing the subdrive to rewind the spare recording medium when the main drive and the subdrive complete the writing of the data; and
 instructing the subdrive to replace the spare recording medium in which an abnormality is detected with another spare recording medium, when the main drive completes the writing of the data and an abnormality is detected in the spare recording medium.

24. A computer readable medium recording thereon a program for enabling a computer to execute an information recording method of an information recorder connected to first and second drives for writing data instructed to be written from a host system in recording media, the first and second drives being connected to recording media, respectively, the method comprising:
 detecting a status of the first and second drive and of a recording medium of each drive;
 instructing the first and second drives to write a same data in the corresponding recording medium; and
 instructing, when an abnormality is detected in the first drive or the recording medium connected to the first drive, the first drive to cancel the writing of the data in the recording medium,
 wherein the information recorder does not notify any abnormality to the host system during writing of the data.

* * * * *